(12) United States Patent
Kwon

(10) Patent No.: US 10,282,084 B2
(45) Date of Patent: May 7, 2019

(54) METHOD OF CONTROLLING FUNCTION EXECUTION IN A MOBILE TERMINAL BY RECOGNIZING WRITING GESTURE AND APPARATUS FOR PERFORMING THE SAME

(71) Applicant: Samsung Electronics Co., Ltd., Gyeonggi-do (KR)

(72) Inventor: Musik Kwon, Seoul (KR)

(73) Assignee: Samsung Electronics Co., Ltd (KR)

( * ) Notice: Subject to any disclaimer, the term of this patent is extended or adjusted under 35 U.S.C. 154(b) by 520 days.

(21) Appl. No.: 13/971,295

(22) Filed: Aug. 20, 2013

(65) Prior Publication Data
US 2014/0053114 A1 Feb. 20, 2014

(30) Foreign Application Priority Data

Aug. 20, 2012 (KR) .................. 10-2012-0090619

(51) Int. Cl.
G06F 3/0481 (2013.01)
G06F 3/0488 (2013.01)

(52) U.S. Cl.
CPC ...... *G06F 3/04883* (2013.01); *G06F 3/04817* (2013.01)

(58) Field of Classification Search
CPC .................................................. G06F 3/04883
See application file for complete search history.

(56) References Cited

U.S. PATENT DOCUMENTS

| | | | | |
|---|---|---|---|---|
| 5,724,526 A | * | 3/1998 | Kunita | ............. G10L 15/26 704/254 |
| 6,094,197 A | | 7/2000 | Buxton et al. | |
| 2001/0024212 A1 | * | 9/2001 | Ohnishi | ............. G06F 3/04817 715/769 |
| 2008/0141181 A1 | * | 6/2008 | Ishigaki | .............. G06F 3/011 715/863 |
| 2010/0066691 A1 | | 3/2010 | Li | |
| 2010/0269040 A1 | | 10/2010 | Lee | |

(Continued)

FOREIGN PATENT DOCUMENTS

CN 101676838 3/2010

OTHER PUBLICATIONS

European Search Report dated Feb. 23, 2017 issued in counterpart application No. 13180901.4-1879, 11 pages.

(Continued)

*Primary Examiner* — Rinna Yi
(74) *Attorney, Agent, or Firm* — The Farrell Law Firm, P.C.

(57) ABSTRACT

Methods and apparatus are provided for executing a function of a mobile terminal by recognizing a writing gesture. The writing gesture that is inputted on a touchscreen of the mobile terminal is detected. At least one target item to which the writing gesture applies is determined. A preset writing gesture of the at least one target item is compared with the detected writing gesture to determine whether the preset writing gesture is at least similar to the detected writing gesture. An execution command corresponding to the preset writing gesture is extracted, when it is determined that the detected writing gesture is at least similar to the preset writing gesture. The function of the at least one target item is executed by the execution command.

15 Claims, 18 Drawing Sheets

(56) References Cited

U.S. PATENT DOCUMENTS

| | | |
|---|---|---|
| 2011/0041102 A1 | 2/2011 | Kim |
| 2011/0050599 A1* | 3/2011 | Sip .................. G06F 1/1626 |
| | | 345/173 |
| 2011/0066976 A1 | 3/2011 | Hwang |
| 2011/0225549 A1 | 9/2011 | Kim |

OTHER PUBLICATIONS

Chinese Office Action dated Apr. 18, 2017 issued in counterpart application No. 201310363134.5, 18 pages.

* cited by examiner

METHOD OF CONTROLLING FUNCTION EXECUTION IN A MOBILE TERMINAL BY RECOGNIZING WRITING GESTURE AND APPARATUS FOR PERFORMING THE SAME

PRIORITY

This application claims priority under 35 U.S.C. § 119(a) to a Korean patent application filed on Aug. 20, 2012 in the Korean Intellectual Property Office and assigned Serial No. 10-2012-0090619, the entire disclosure of which is incorporated herein by reference.

BACKGROUND OF THE INVENTION

1. Field of the Invention

The present invention relates generally to a method of controlling execution of a function in a mobile terminal and an apparatus for performing the same, and more particularly, to a method of controlling execution of a function in a mobile terminal by detecting a writing gesture that is input by a user through a touchscreen and an apparatus for performing the same.

2. Description of the Related Art

Communication methods and personal information processing are performed by mobile communication terminals such as, for example, Personal Digital Assistants (PDAs), electronic notes, smart phones, and tablet Personal Computers (PCs).

These mobile terminals have various applications such as, for example, a voice call function, a message-sending function (e.g., Short Message Service/Multimedia Message Service (SMS)/(MMS)), a video call function, an electronic note function, a photographing function, an e-mail sending and receiving function, a broadcasting reproducing function, a motion picture playing function, an Internet surfing function, an electronic trading function, a music playing function, a scheduling function, a Social Networking Service (SNS) function, a messenger function, a dictionary function, a game function, etc.

Mobile terminals also include a touchscreen capable of receiving an execution command directly from a display, without using a keyboard. Specifically, when a finger of a user or an object, such as a stylus pen, touches a specific character displayed on a screen or a specific position on the screen, specific processing is performed by which software stored in the mobile terminal recognizes the specific character or specific position.

Touchscreens serve as a User Interface (UI) connecting a user with an electronic device.

However, a user is generally required to check a touch menu displayed on the touchscreen in order to provide input, and to enter a number of commands for execution of a single application.

It can be difficult to display the various touch menus on a narrow touchscreen, and inconvenient for a user to input a desired command at each of the plurality of steps.

SUMMARY OF THE INVENTION

The present invention has been made to address at least the above problems and/or disadvantages and to provide at least the advantages described below. Accordingly, an aspect of the present invention provides an easy user-accessible method for executing a function in a mobile terminal and an apparatus for performing the same.

The present invention also provides a user interface that allows for convenient and intuitive function execution in a mobile terminal, and control thereof.

The present invention also provides a method for conveniently and quickly performing function execution in a mobile terminal using a writing gesture that is input through a touchscreen.

The present invention also provides a method for conveniently and quickly controlling execution of various functions by detecting a writing gesture input between a plurality of items, and an apparatus for performing the same.

In accordance with an aspect of the present invention, a method is provided for executing a function of a mobile terminal by recognizing a writing gesture. The writing gesture that is inputted on a touchscreen of the mobile terminal is detected. At least one target item to which the writing gesture applies is determined. A preset writing gesture of the at least one target item is compared with the detected writing gesture to determine whether the preset writing gesture is at least similar to the detected writing gesture. An execution command corresponding to the preset writing gesture is extracted, when it is determined that the detected writing gesture is at least similar to the preset writing gesture. The function of the at least one target item is executed by the execution command.

In accordance with the aspects of the present invention, an apparatus is provided for executing a function of a mobile terminal by recognizing a writing gesture. The apparatus includes a writing gesture detector for detecting the writing gesture that is inputted on a touchscreen of the mobile terminal. The apparatus also includes a target item determination unit for determining at least one target item to which the writing gesture detected by the writing gesture detector applies. The apparatus additionally includes a writing gesture comparator for comparing a preset writing gesture of the at least one target item to the detected writing gesture to determine whether the preset writing gesture is at least similar to the detected writing gesture. The apparatus further includes an execution command extractor for extracting an execution command corresponding to the present writing gesture, when it is determined that the detected writing gesture is at least similar to the preset writing gesture. The apparatus also includes a target item function execution controller for executing the function of the at least one target item under the execution command extracted by the execution command extractor.

BRIEF DESCRIPTION OF THE DRAWINGS

The above and other aspects, features, and advantages of the present invention will be more apparent from the following detailed description when taken in conjunction with the accompanying drawings, in which.

DETAILED DESCRIPTION OF EMBODIMENTS OF THE PRESENT INVENTION

Figure 1:
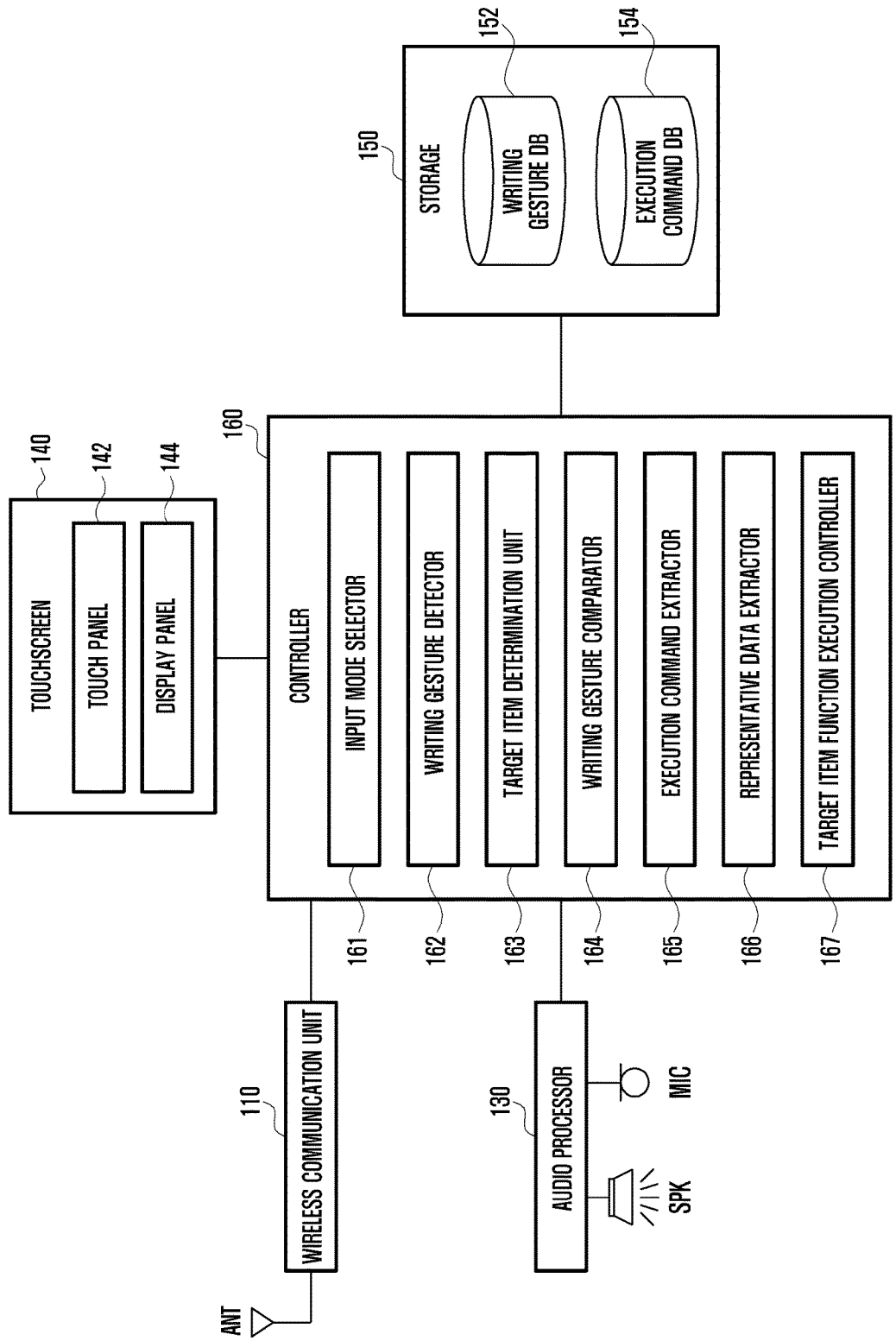
FIG. 1 is a block diagram illustrating a configuration of a mobile terminal, according to an embodiment of the present invention.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

The configuration and operation controlling method of a mobile terminal, according to an embodiment of the present invention, is described in detail with reference to the accompanying drawings. However, the configuration and operation controlling method of the mobile terminal are neither limited nor restricted by the following description and may be applied to various embodiments of the present invention. Embodiments of the present invention are described as hardware. However, embodiments of the present invention includes technologies that utilizes hardware and software, and thus, does not exclude approaches based on software.

The mobile terminal of the embodiments of the present invention may be an information communication device, such as, for example, a tablet PC, a mobile communication terminal, a mobile phone, a PDA, a smart phone, an International Mobile Telecommunications 2000 (IMT 2000) terminal, a Code Division Multiple Access (CDMA) terminal, a Wideband Code Division Multiple Access (WCDMA) terminal, a Global System for Mobile communication (GSM) terminal, a General Packet Radio Service (GPRS) terminal, an Enhanced Data GSM Environment (EDGE) terminal, a Universal Mobile Telecommunication Service (UMTS) terminal, a digital broadcasting terminal, an Automated Teller Machine (ATM), a multimedia device, and an application thereof.

Embodiments of the present invention include features of switching an operating mode of a mobile terminal to a writing gesture input mode, allowing a user to input a writing gesture through a touchscreen to directly execute a function of the mobile terminal, and controlling execution of the function execution of the mobile terminal.

FIG. 1 is a block diagram illustrating a configuration of a mobile terminal, according to an embodiment of the present invention.

Referring to FIG. 1, a mobile terminal includes a wireless communication unit 110, an audio processor 130, a touchscreen 140, a storage 150, and a controller 160.

The mobile terminal may use UIs corresponding to a writing gesture to allow a user to touch content in which the UIs, an item, and an image are associated with each other, through the touchscreen 140.

An item refers to a menu including an application provided by the mobile terminal and an object set for execution of a function. For example, the object allows for execution of a specific function or a sub-menu mapped thereto, on the screen of the mobile terminal, and may be provided in the form of various Graphical User Interfaces (GUI) such as, for example, text, an icon, an icon list, a widget, and the combination thereof.

The wireless communication unit 110 performs communications of the mobile terminal. Specifically, the wireless communication unit 110 forms a preset communication channel with a supportable network (station) under the control of the controller 160, and performs data transmission and reception related to data communication such as, for example, a wireless communication (voice communication and video communication), an SMS, an MMS, and internet communication. The wireless communication unit 110 converts voice/sound data and control data into radio signals for transmission, and receives a radio signal to convert the same into voice/sound data and control data. The wireless communication unit 110 may include a transceiver performing upconversion of frequency and amplification of a transmitting signal, and low-noise amplification and frequency downconversion of a receiving signal. In an embodiment of the present invention, the wireless communication unit 110 is singular, but may be plural to correspond to multi-communication supported by the mobile terminal.

The audio processor 130 includes a speaker SPK that reproduces audio data received by the mobile terminal during wireless communication, and a microphone MIC that collects a user's voice or other audio signals. The audio processor 130 is connected to the microphone MIC and the speaker SPK and converts a signal received from the microphone MIC into data to output the same to the controller 160.

The signal inputted to the audio processor 130 from the controller 160 is converted into audible sound through the speaker SPK. Specifically, the audio processor 130 converts an analog signal input through the microphone MIC into a digital voice signal, or converts a digital voice signal input from the controller 160 into an analog signal for output through the speaker SPK. In addition, the audio processor 130 may reproduce various audio components, such as, for example, an audio signal related to reproduction of an MP3 file, generated in the mobile terminal according to user selection.

Particularly, the audio processor 130 may output an audio signal when a writing gesture is input or when an application is executed by inputting the writing gesture. The output of the audio signal, which notifies a user of the input of the writing gesture and of the execution of an application caused by the input writing gesture, may be omitted by a user's setting or by design, or may be provided instead as a preset vibration pattern.

The touchscreen 140 includes a touch panel 142 to which the writing gesture is input and a display panel 144, which outputs a screen activated according to execution of a function of a target item, and data generated by the target item. The display panel 144 may output, for example, a booting screen, a standby screen, a menu screen, and a call screen.

Particularly, the touchscreen 140 outputs a trace path of user's writing gesture on the touchscreen 140, such that a user can visibly check his/her writing gestures. The writing gesture is outputted on or near an item and can remain displayed when a target item is executed or switched.

The storage 150 may be implemented by a Read Only Memory (ROM) and a Random Access Memory (RAM). The storage 150 stores various types of data generated by and utilized in the mobile terminal. The data includes data generated when a function of a mobile terminal is executed, such as, for example, information inputted by the writing gesture, information about a writing gesture generated for the initial setting, information about an execution command matched to every writing gesture, every type of storable data generated by a mobile terminal or received, and a menu item for the direct execution of a preset corresponding function/menu of supporting functions of the mobile terminal. The storage 150 may store data for the communication performed by the wireless communication unit 110 and various setting information for use of the mobile terminal.

Moreover, the storage 150 may include at least one buffer temporally storing data generated during the function execution of the mobile terminal. For example, the storage 150 may perform a function of buffering signals transmitted and received by the wireless communication unit 110 as large as a preset size. In addition, the storage 150 may perform a function of buffering data in a preset size generated when an application is executed by recognizing a writing gesture.

The storage 150 may be provided in the mobile terminal, outside the mobile terminal, a smart card, for example, or may include both internal/external storing media. The storage 150 may be implemented by an independent memory such as a ROM, a flash memory, a RAM, a single integrated memory, or two memories such as Multi-Chip Packages (MCP).

A writing gesture database 152 of the storage 150 stores information about writing gestures preset with respect to every item. A plurality of writing gestures may be preset with respect to a single item and may be stored.

An execution command database 154 of the storage 150 stores an execution command mapped to the preset writing gesture. The execution commands stored in the execution command database 152 may relate to the execution of an application corresponding to an item and control thereof. One writing gesture is preferably mapped to one execution command.

The controller 160 performs overall control of the mobile terminal and controls signal flow between respective elements in the mobile terminal.

Particularly, the controller 160 includes an input mode selector 161, a writing gesture detector 162, a target item determination unit 163, a writing gesture comparator 164, an execution command extractor 165, a representative data extractor 166, and a target item function execution controller 167.

The input mode selector 161 of the controller 160 receives a signal selecting a general touch input mode and a writing gesture input mode of the mobile terminal from a user.

The writing gesture input mode may be selected through an input mode-selecting menu displayed on the touchscreen 140 of the mobile terminal.

Figure 16:
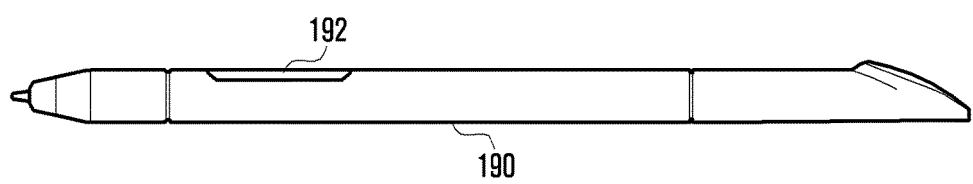
FIG. 16 is a diagram illustrating pen employed with the mobile terminal, according to embodiment of the present invention.

The writing gesture input mode, as illustrated in FIG. 16, may be selected by an exclusive pen 190 associated with the mobile terminal. Specifically, the mode of the mobile terminal may be switched to the writing gesture input mode by a button 192 provided in the exclusive pen 190.

The writing gesture input mode may be, for example, a mode where a writing gesture implemented as at least one of a character, a number, a symbol, a figure, a line, and a combination thereof, is inputted to the touchscreen by the exclusive pen 190.

When the mobile terminal is switched to the writing gesture input mode, the writing gestures inputted to the touchscreen 140 are detected, and the detected writing gestures may be output on the touchscreen 140 as they are inputted.

In this embodiment of the present invention, the mobile terminal is set to the writing gesture input mode.

The writing gesture detector 162 detects a writing gesture inputted to the touchscreen 140. Specifically, the writing gesture detector 162 detects a writing gesture on the touchscreen 140 generated by the exclusive pen 190, and converts the detected writing gesture into a signal for transmission to the target item determination unit 163 and the writing gesture comparator 164.

The writing gesture detector 162 may use a resistive (pressure sensitive) method, a capacitive method, an infrared ray method, an ultrasonic method, or the combination thereof, for the detection of an input means, however the present invention is not limited thereto.

The target item determination unit 163 determines a target item of the writing gesture detected by the writing gesture detector 162. Specifically, the target item determination unit 163 determines an item in contact with, overlapped with, or adjacent to the inputted writing gesture, as the target item. At least one target item may be detected.

The writing gesture comparator 164 compares a preset writing gesture of the target item with the detected writing gesture.

The preset writing gesture of the target item may be for execution and control of the target item. Since there are various functions of a target item such as, for example, execution, termination, and control, different writing gestures matched to respective functions may be preset and stored. Thus, a plurality of preset writing gestures may be preset for every item. The preset writing gestures of a target item may be stored in the writing gesture database 152.

The execution command extractor 165 extracts an execution command corresponding to the preset writing gesture, which is associated with the detected writing gesture, from the execution command database 154.

The execution commands stored in the execution command database 154 may relate to, for example, execution of a function of an item.

The representative data extractor 166 extracts representative data generated by executing the function of the target item.

The representative data may be defined by latest data generated by execution of the function of the target item, or by information identifying content of the target item.

The target item function execution controller 167 controls the execution of the function of the target item under the execution command extracted from the execution command extractor 165.

The execution of the function of the target item may be controlled according to at least one of a numeric writing gesture, a size of a figure, shape of a figure, a length, a direction, a shape, and a thickness of a line, and a combination thereof.

The target item function execution controller 167 applies the representative data extracted by the representative data extractor 166 for the control of execution of the function of the target item under the execution command.

The mobile terminal may include other elements, such as, for example, a camera module, a near field communication module, an internet communication module, and a digital broadcasting module.

Hereinafter, operations of the mobile terminal are described, according to embodiments of the present invention. It should be understood that the operations of the mobile terminal are not limited to following description, but various embodiments thereof may be available based on the following embodiments.

Figure 2A:
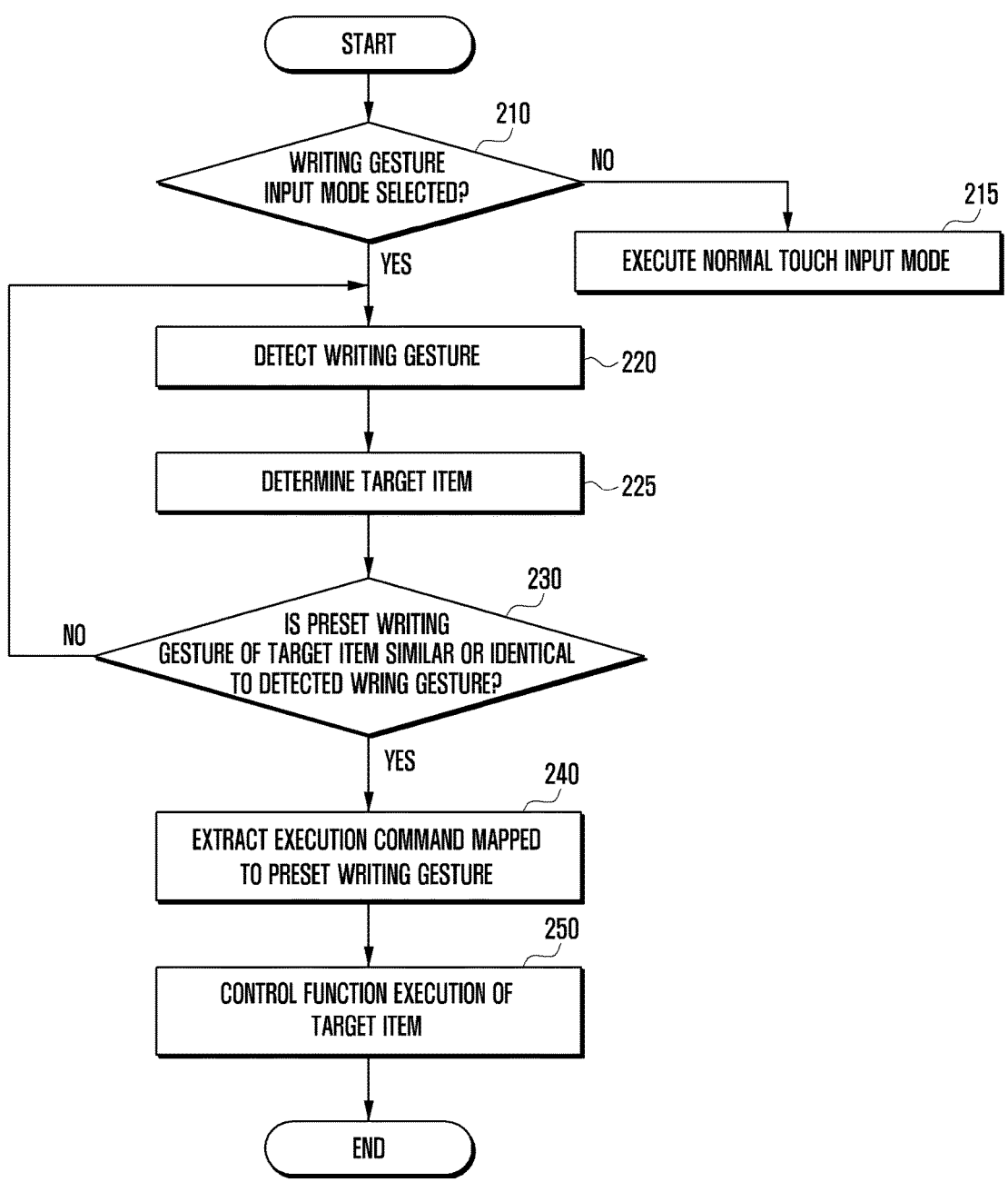
FIGS. 2A to 2C are flowcharts illustrating a method of controlling function execution of a target item by recognizing a writing gesture in the mobile terminal, according to an embodiment of the present invention.
Figure 2B:
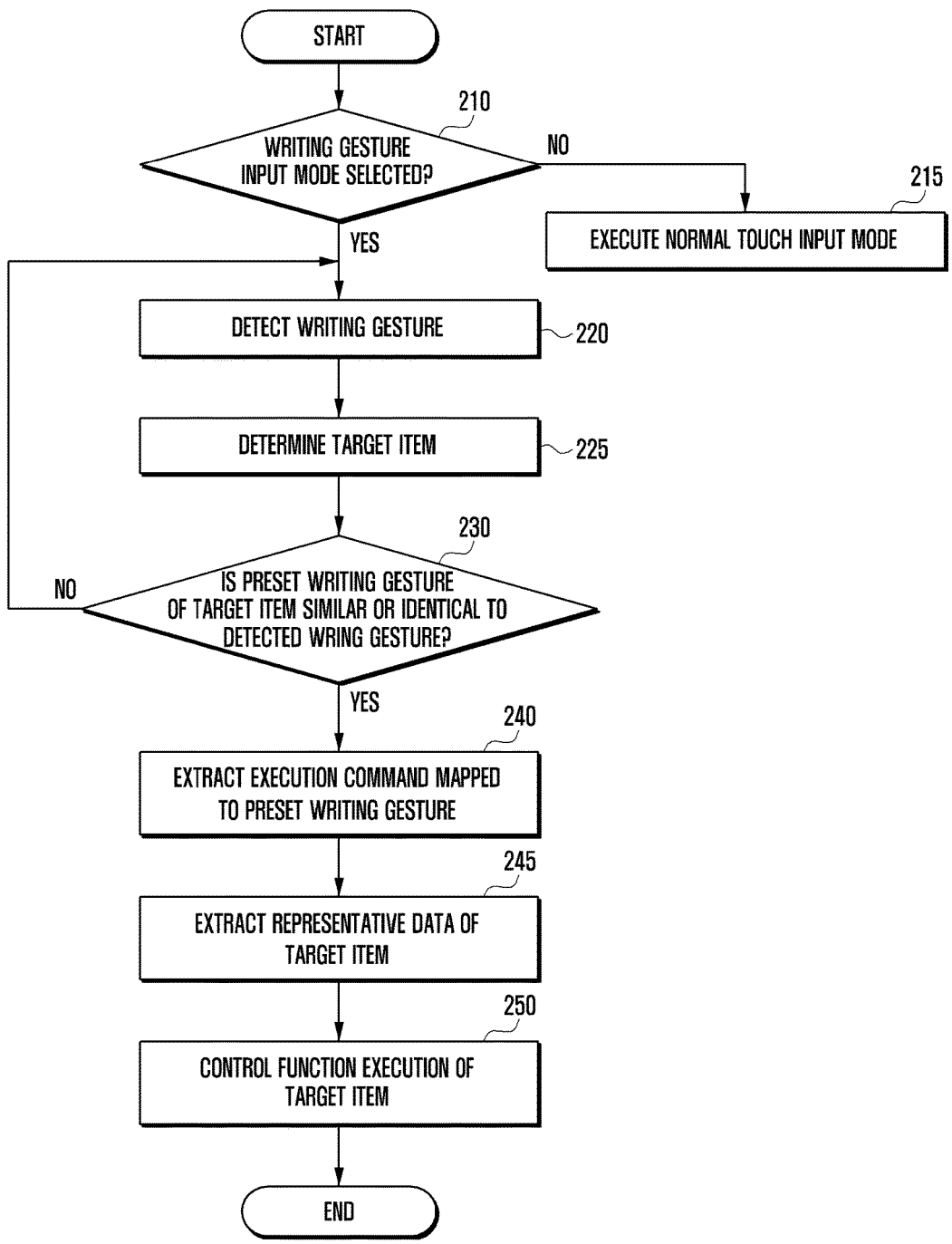
Figure 2C:
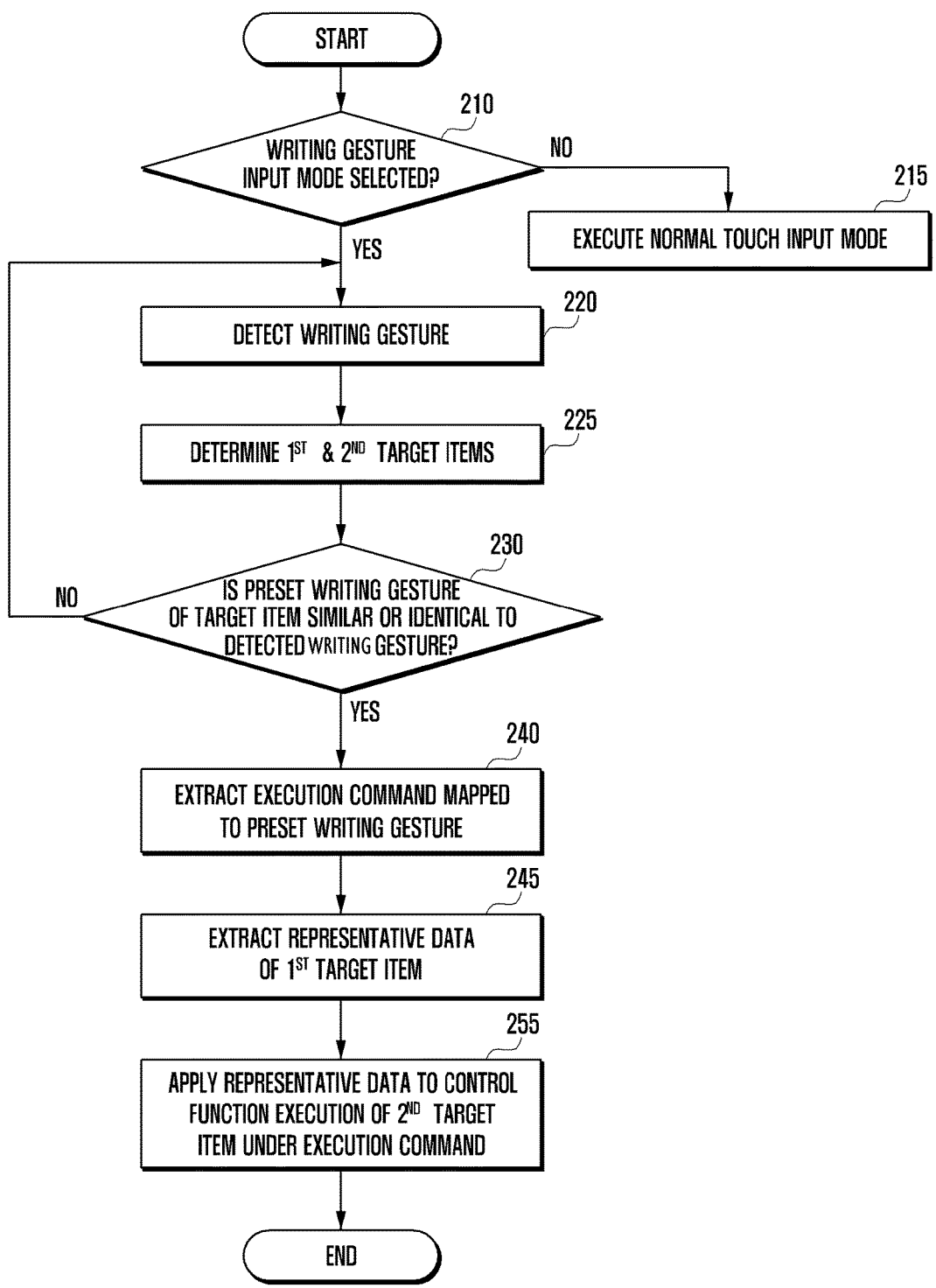

FIGS. 2A to 2C are flowcharts illustrating a method of controlling execution of a function of a target item by recognizing a writing gesture in the mobile terminal, according to an embodiment of the present invention.

FIG. 2A is a flowchart illustrating a method of controlling execution of a function of a target item, when a writing gesture is inputted to target a single item.

It is determined whether the input mode selector 161 receives a signal selecting any one of the writing gesture input mode and the general touch input mode from a user, in step 210.

Particularly, a mobile terminal supporting a writing gesture recognizing environment, employed in this embodiment of the present invention, supports operating modes classified into a general touch input mode and a writing gesture input mode. The mobile terminal may use a touch input managed in the general touch input mode or a writing gesture input managed in the writing gesture input mode to support internal output and external output.

The writing gesture input mode may be selected through the input mode-selecting menu displayed on the touchscreen 140 of the mobile terminal.

As illustrated in FIG. 16, the writing gesture input mode may also be selected by the exclusive pen 190, associated with the mobile terminal. Specifically, the operating mode of the mobile terminal may be switched to the writing gesture input mode using the button 912 provided in the exclusive pen 190.

The writing gesture input mode may be a mode where a writing gesture embodied as, for example, at least one of a character, a number, a symbol, a figure, a line, and the combination thereof, is inputted to the touchscreen by the exclusive pen 190.

When the mobile terminal is switched to the writing gesture input mode, the writing gestures inputted to the touchscreen may be detected and outputted on the touchscreen as they are inputted.

When the general touch input mode is selected in step 210, the general touch input mode of the mobile terminal is executed, in step 215.

When the writing gesture input mode is selected in step 210, the writing gesture detector 162 detects a writing gesture inputted to the touchscreen 140, in step 220.

The target item determination unit 163 determines a target item of the writing gesture, in step 225. The target item may be determined as an item that is in contact with, overlapped with, or adjacent to the input writing gesture. At least one target item may be determined by detecting the writing gesture. The target item may be, for example, a call icon, a text message icon, a music player icon, a gallery icon, a web browser icon, etc.

The writing gesture comparator 164 compares the preset writing gesture of the target item with the detected writing gesture to determine if the detected writing gesture is similar to, or identical to, the preset writing gesture, in step 230.

A plurality of writing gestures for a single target item may be defined with respect to the function execution of the target item and stored in the writing gesture database 152. Thus, the writing gesture detector 164 may determine whether one detected writing gesture is identical to, or similar to, one of the plurality of the preset writing gestures stored in the writing gesture database 152.

For example, a music player icon may have at least five writing gestures such as, for example, a writing gesture to play music, a writing gesture to pause music, a writing gesture to play a previous music file, and a writing gesture to play a next music file.

If the input writing gesture is similar to, or identical to, a stored preset writing gesture in shape, the writing gesture comparator 164 may extract a preset writing gesture corresponding to the input writing gesture.

Conversely, if it is determined that none of the writing gestures stored in the writing gesture database 152 is identical to, or similar to, the input writing gesture, the mobile terminal may make a request for a user to input the writing gesture again, or to input another writing gesture, returning to step 220.

If it is determined that there is a similar writing gesture in the writing gesture database 152 in step 230, the execution command extractor 165 extracts an execution command mapped to the preset writing gesture corresponding to the detected writing gesture, in step 240.

Execution commands mapped to the writing gesture in advance may be stored in the execution command database 154. Preferably, one execution command is mapped exclusively to each writing gesture.

The execution command may be a command to control execution of a function of a target item, for example, a WiFi communication execution command, a WiFi communication stop command, a music play command, a pause command, and a play next and previous music file command, a latest image fetch command, a command to delete a selected item from a list, a command to brighten a screen of the mobile terminal, a command to directly make a call to a caller of a missed call, a command to directly make a call to a text message sender, a command to store latest generated monthly schedule data directly to a memo application, etc.

When the execution command mapped to the preset writing gesture is extracted in step 240, the target item function execution controller 167 controls execution of the function of the target item, in step 250.

Figure 5:
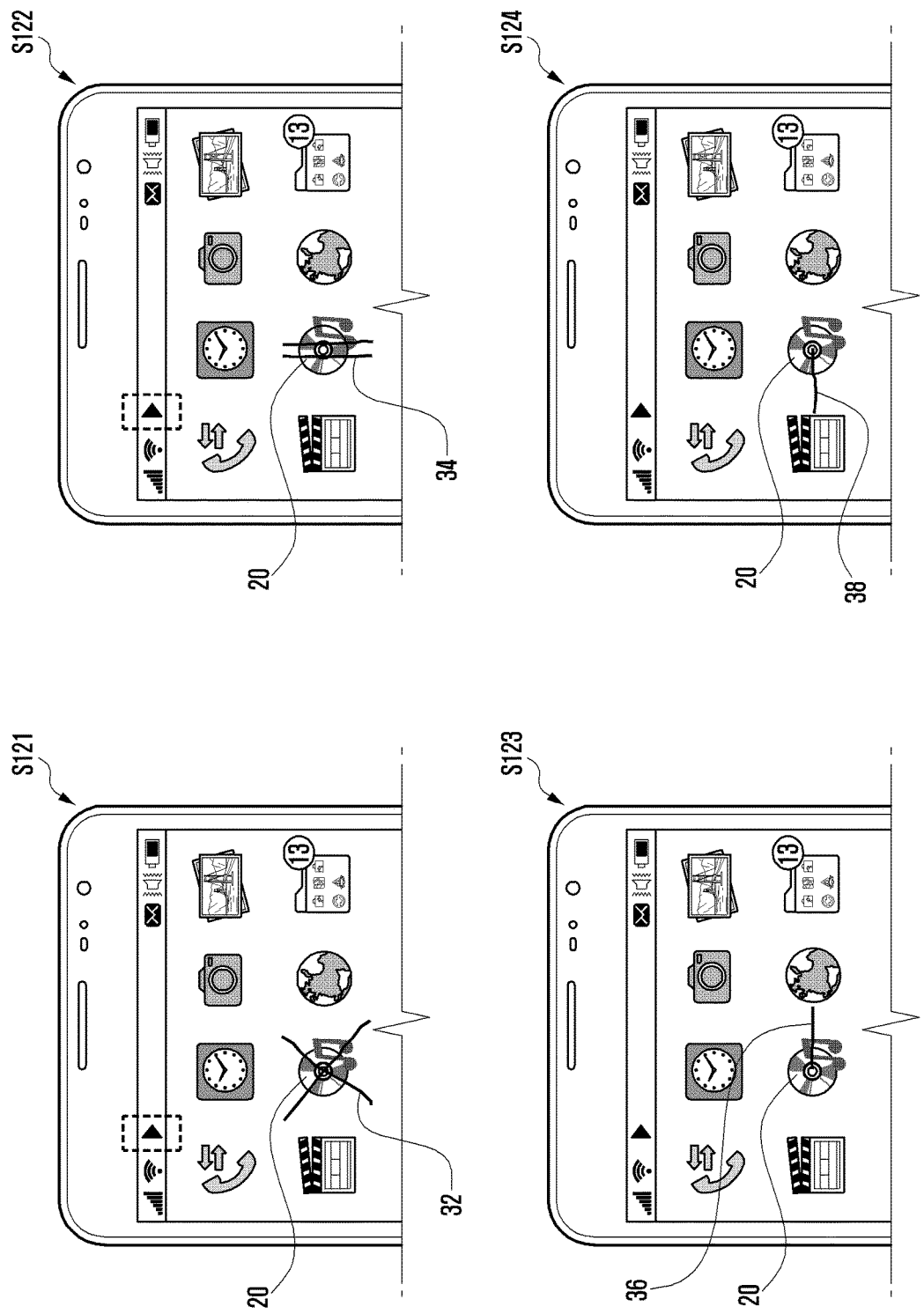
FIG. 5 is a diagram illustrating an operation screen controlling execution of a music player of the mobile terminal, according to an embodiment of the present invention.

For example, referring to FIG. 5, it is assumed that an execution command to pause a playing function of a music player application related to a music player icon 20, is mapped in advance to a writing gesture in the shape of '||'. The writing gesture in the shape of '||' is stored in the writing gesture database 152 while an execution command to pause the music playing by the music player is stored in the execution command database 154.

When a user inputs a writing gesture 24 in the shape of '||' on the music player icon through the touchscreen 140, the writing gesture detector 162 detects the writing gesture 24 in the shape '||'. The target item determination unit 163 determines the music player icon 20 overlapped by the writing gesture 24 in the shape of '||', as a target item. The writing gesture comparator 164 extracts a writing gesture in the same shape as the writing gesture 24 in the shape of '||' from the writing gesture database 152. The execution command extractor 165 extracts a command to pause the playing function of the music player application mapped to the extracted writing gesture in the shape of '||'. The target item function execution controller 167 pauses the playing function of the music player application under the command to pause the playing function of the music player application related to the music player icon 20.

The method of controlling execution of a function of a mobile terminal by recognizing a writing gesture, according to an embodiment of the present invention, may be applied to extract representative data of a target item and to apply the representative data to control execution of a function of the mobile terminal.

FIG. 2B illustrates the above-described embodiment, which further includes extracting representative data of a target item, in step 245, before controlling execution of the function of the target item, in step 250. Hereinafter, steps indicated by the same reference numerals as those in FIG. 2A are identical in operation.

The representative data may be defined, by a user, as the latest data generated by execution of the function of a target item, or data designated by a user in advance.

For example, representative data of a gallery application may be defined as a latest stored image data. Representative data of a text message application may be defined as a phone number of a latest received text message. Representative data of a call application may be defined as a phone number of a latest received call. Representative data of a music player application may be defined as a latest played music file.

When an execution command mapped to a preset writing gesture is extracted in step 240, the representative data extractor 166 extracts representative data generated by execution of the execution of a target item, as described above, in step 245.

When the representative data is extracted in step 245, the target item function execution controller 167 applies the representative data to control execution of the function of the target item, in step 250.

The representative data of the gallery application and execution of the function for changing the gallery icon to the representative data is described below with reference to FIGS. 1, 2B, and 7.

It is assumed that the representative data of the gallery application is set to the latest stored image and that an execution command to switch an image representing the gallery icon and displayed on the touchscreen 140 to the latest stored image is mapped to a specific writing gesture in advance.

Figure 7:
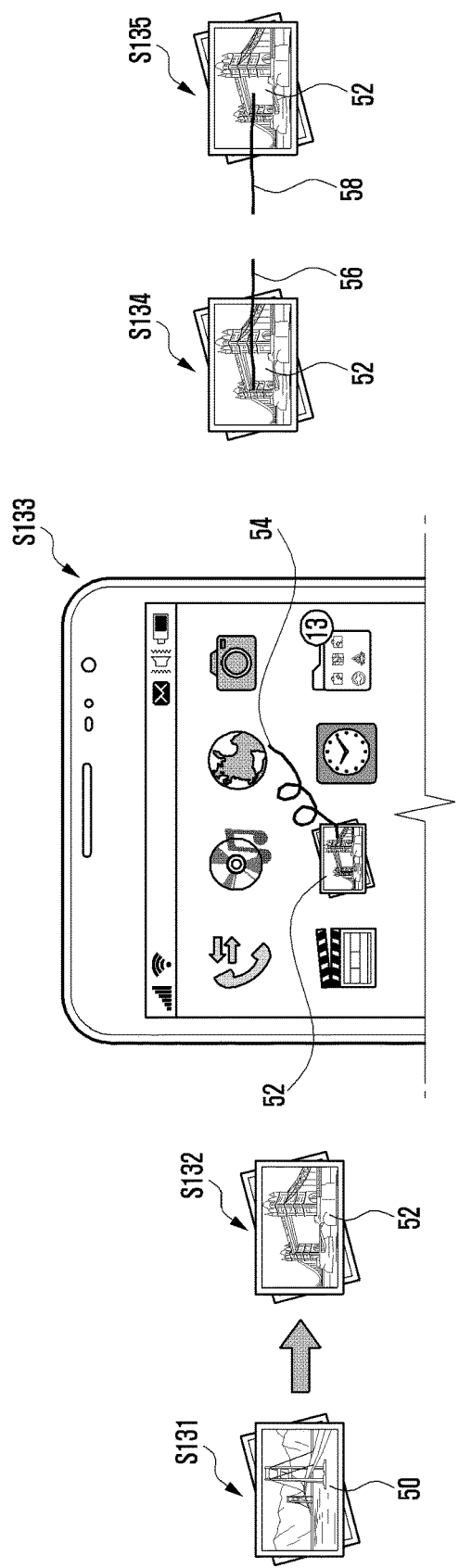
FIG. 7 is a diagram illustrating a writing gesture that changes a gallery icon directly in the mobile terminal, according to an embodiment of the present invention.

Under the above assumption, when the specific writing gesture is input, the representative data extractor 166 may extract the latest image, stored in the gallery application, as the representative data, while the target item function execution controller 167 may replace a previous image 30 displayed as the representative data of the gallery application with the latest stored image 32 as the representative data (S131 and S132 of FIG. 7).

However, in the method of controlling execution of a function of a mobile terminal by recognizing a writing gesture, the writing gesture may be inputted to target at least one item.

FIG. 2C illustrates the above-described embodiment, which differs from the embodiment illustrated in FIG. 2B, in that writing gestures are inputted targeting a first item and a second item. After the detection of a writing gesture, in step 220, the first target item and the second target item are determined, in step 225), representative data of the first target item is extracted, in step 245), and representative data is applied to control execution of the function of the second target item, in step 255.

Referring to FIG. 2C, a writing gesture may be inputted in association with the first item and the second item. The first item and the second item may be to execute different functions displayed on the touchscreen.

Figure 8:
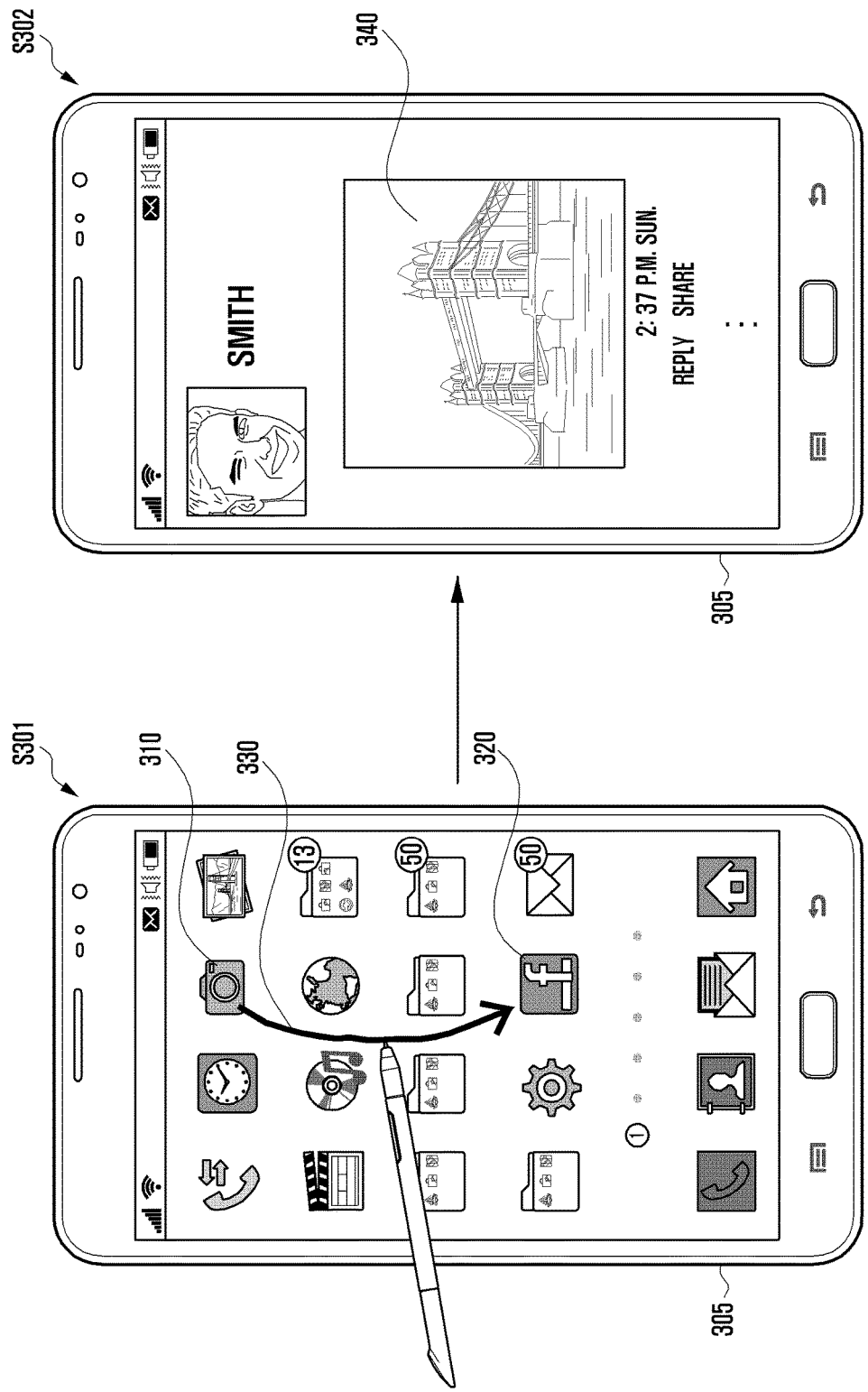
FIG. 8 is a diagram illustrating an operation screen for uploading a latest photo, photographed with a camera application of the mobile terminal, directly to an online social network, according to an embodiment of the present invention.

Referring to FIGS. 2C and 8, it is assumed that the first item is a camera icon 310 and that the second item is a social network icon 320.

The latest photo data photographed by the camera application related to the camera icon 310 may be set as representative data. An execution command to upload the representative data generated by the camera application related to the camera icon 310 on a social network may be mapped in advance to an arrow-shaped writing gesture from the camera icon 310 to the social network icon 320. The execution command may be stored in the execution command database 154 and the arrow-shaped writing gesture may be stored in the writing gesture database 152.

When a user inputs an arrow-shaped writing gesture 330 in the direction from the camera icon 310 to the social network icon 320 under the above assumption, the writing gesture detector 162 detects the arrow-shaped virtual manuscript 92, in step 220.

The target item determination unit 163 determines the camera icon 310 and the social network icon 320, which are in contact with the arrow-shaped virtual manuscript 330, as the first target item and the second target item, respectively, in step 225.

The target item determination unit 163 determines an item in contact with a starting portion of the arrow of the arrow-shaped virtual manuscript as the first target item, and an item in contact with an end of the arrow of the arrow-shaped virtual manuscript as the second target item.

The writing gesture comparator 164 extracts the same writing gesture as the arrow-shaped writing gesture 330 from the writing gesture database 152, in step 230.

The execution command extractor 165 extracts an execution command mapped to the extracted arrow-shaped writing gesture, in step 240.

The execution command may be preset in advance for the first target item and the second target item to store.

The arrow-shaped writing gesture 330 moving from the camera icon 310 to the social network icon 320 may be preset as a command to upload the representative data of the camera application related to the camera icon 310 online by executing the social network application related to the social network icon 320.

The representative data extractor 166 extracts the latest photographed image data as the representative data of the camera application related to the camera icon 310, in step 245).

The target item function execution controller 167 uploads the latest photographed image data to an online social network of the social network application related to the social network icon 320, in step 255).

Thus, according to an embodiment of the present invention, a user inputs a writing gesture in association with the camera icon 310 and the social network icon 320 so that the latest photo photographed by the camera application can be uploaded to the online social network by only one input of the writing gesture 330, without following several procedures for the uploading of photo to the online social network through a mobile terminal.

Hereinafter, operating screens of a mobile terminal where execution of a function of an item is performed by detecting a writing gesture, according to embodiments of the present invention, are described with reference to FIGS. 3 to 15.

Figure 3:
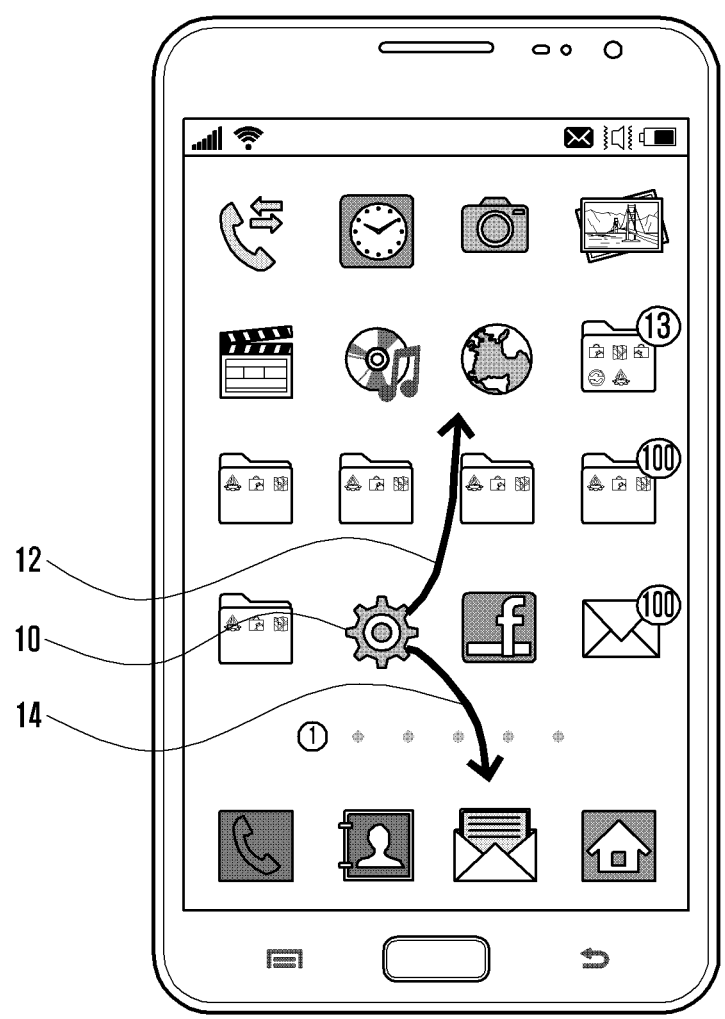
FIG. 3 is a diagram illustrating an operation screen controlling execution of a function that adjusts brightness of a mobile terminal, according to an embodiment of the present invention.

FIG. 3 is a diagram illustrating an operation screen controlling execution of a function of adjusting brightness of the mobile terminal by a setting item, according to an embodiment of the present invention.

The touchscreen 140 of the mobile terminal provides a screen that includes icons that a user may select. For example, the touchscreen 140 may provide an idle screen that includes a preset number of menu icons.

Operations for controlling brightness of a screen, when an input writing gesture targeting a setting icon 10 is detected, are described with reference to FIGS. 1, 2A, and 3.

A plurality of arrow patterns writing gestures 12 and 14 of different directions or lengths are mapped to the setting icon 10 in advance to control brightness of the touchscreen. The arrow-patterned writing gestures 12 and 14 are stored in the writing gesture database 152.

The arrow-patterned writing gesture 12 targeting the setting icon 10 is input on the touchscreen by a user's finger or an exclusive pen. The trace of the writing gesture is outputted in the form of a visual effect, for example, in the form of an image on the touchscreen 140, such that a user can visually recognize the writing gesture.

Arrow patterns with relatively different vertical positions or different lengths may be inputted as the writing gestures. For example, a long writing gesture or a writing gesture with an upward-directional arrow may be set as a writing gesture to brighten the screen, while a short writing gesture or a writing gesture with a downward-directional arrow may be set as a writing gesture to darken the screen.

When a writing gesture with an upward-directional arrow pattern 12 is inputted to the touchscreen 140, the writing gesture detector 162 detects the input writing gesture, in step 220).

The target item determination unit 163 detects an icon with which the writing gesture in the arrow pattern 12 is in contact, and determines the setting icon 10 as a target item, in step 225.

When the target item is determined, the writing gesture comparator 164 compares the input writing gesture with the preset writing gesture stored in the writing gesture database 152 to determine whether the input writing gesture is identical to, or similar to, the stored preset writing gesture, in step 230.

If the writing gesture database 152 has a writing gesture identical to, or similar to, the input writing gesture, the execution command extractor 166 extracts an execution command mapped to the corresponding writing gesture, in step 240.

The execution command is a command to control brightness of the screen of the mobile terminal. Under the execution command extracted by the execution command extractor 166, the target item function execution controller 167 executes an application related to the brightness control of the setting icon 10 to increase the brightness of the screen of the mobile terminal, in step 250.

Thus, according to an embodiment of the present invention, a user may input a writing gesture to be in contact with the setting icon 10 so that brightness of the screen can be directly controlled without following several procedures for the brightness control of a screen through the setting icon 10.

Figure 4:
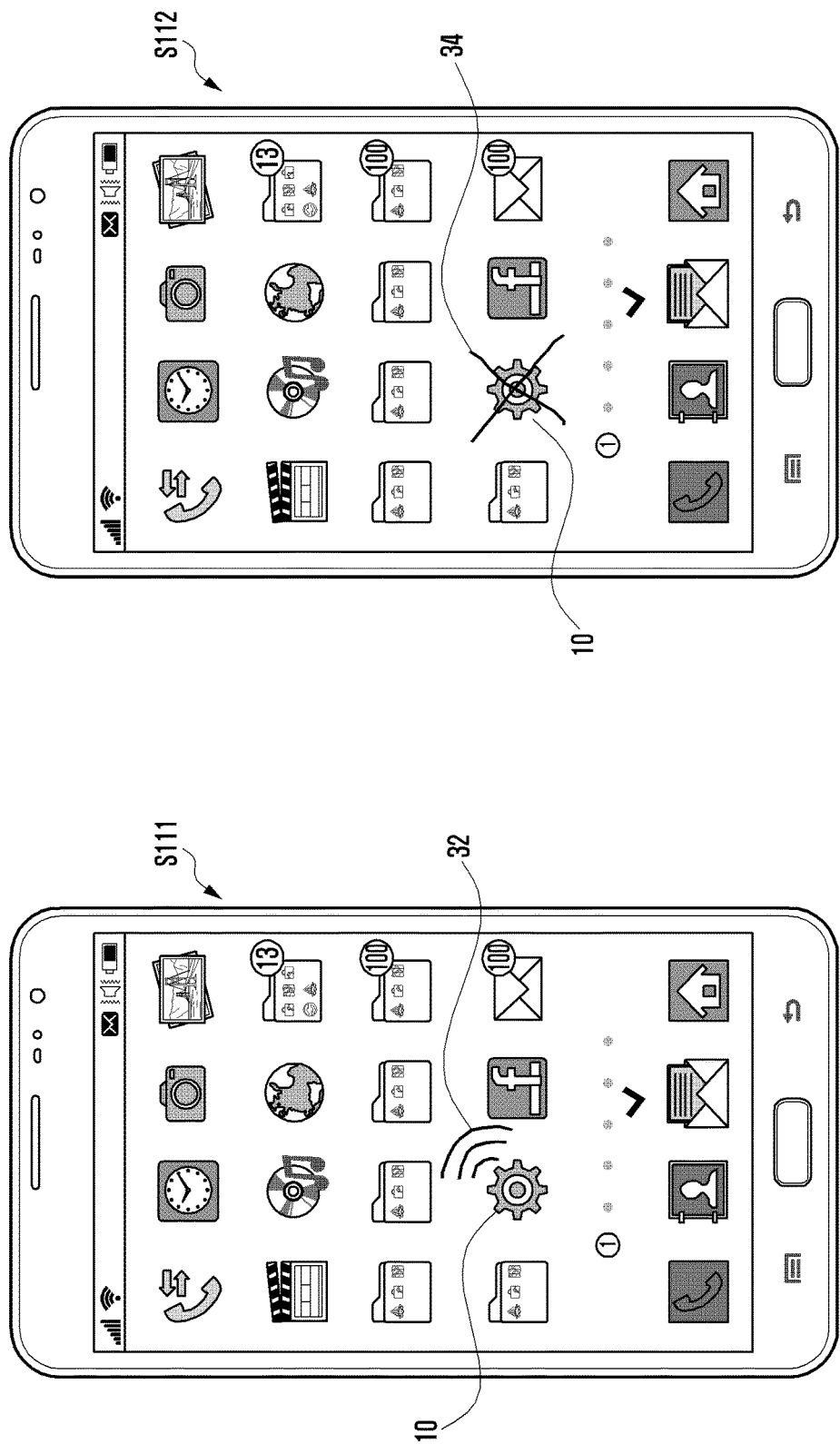
FIG. 4 is a diagram illustrating operation screens controlling execution of WiFi communication in the mobile terminal, according to an embodiment of the present invention.

FIG. 4 is a diagram illustrating operation screens for controlling execution of WiFi communication in the mobile terminal, according to an embodiment of the present invention.

Operations of controlling the execution of WiFi communication by detecting an input writing gesture targeting the setting icon 10 are described with reference to FIGS. 1, 2A, and 4.

A WiFi symbol 32, which is widely used to indicate WiFi communication, is mapped in advance to the setting icon 10 as a writing gesture to control execution of WiFi communication. The WiFi symbol 32 is be mapped to the setting icon 10 and stored in the writing gesture database 152. Moreover, an 'X'-shaped pattern 34, is mapped in advance to the setting icon 10 as a writing gesture to release execution of WiFi communication and stored in the writing gesture database 152.

As indicated in screen S111 of FIG. 4, a writing gesture of the WiFi symbol 32 may be inputted near the setting icon 10 with a user's finger or an exclusive pen.

When the writing gesture of the WiFi symbol 32 is inputted, the writing gesture detector 162 detects the virtual manuscript, in step 220.

The target item determination unit 163 determines the setting icon 10 closest to the writing gesture as a target item, in step 225.

When the target item is determined, the writing gesture comparator 164 compares the input writing gesture with the preset writing gesture stored in the writing gesture database 152 to determine whether they are identical to, or similar to, each other, in step 230.

As a result of the comparison, if the writing gesture database 152 has a writing gesture identical to, or similar to, the input writing gesture, the execution command extractor 166 extracts an execution command mapped to the corresponding writing gesture, in step 240.

The execution command may be a command to execute the WiFi communication of a mobile terminal. Under the execution command, the target item function execution controller 167 directly executes an application associated with the WiFi communication of the setting icon 10 to execute the WiFi communication of the mobile terminal, in step 250.

Conversely, when a stop-symbolic writing gesture 24 is inputted on the setting icon 10 as indicated in screen S112, the WiFi communication of a mobile terminal is terminated.

Thus, according to an embodiment of the present invention, when a user inputs writing gestures, such as the WiFi symbol or the ending pattern, near the setting icon 10, the writing gesture may control the execution of WiFi communication without following several procedures for the control of WiFi communication.

FIG. 5 is a diagram illustrating an operation screen for controlling execution of a music player in the mobile terminal, according to an embodiment of the present invention.

Operations to control execution of the music player, when an input writing gesture targeting the music player icon 20 is detected, are described with reference to FIGS. 1, 2A, and 5.

A stop symbol 32 is defined as a writing gesture to stop music played by the music player, as shown in screen S121. A pause symbol 34 is defined as a writing gesture to pause music played by the music player, as shown in screen S122. A forward symbol 36 is defined as a writing gesture to play a next music file by the music player, as shown in screen S123. A backward symbol 38 is defined as a writing gesture to play a previous music file by the music player, as shown in screen S124. The writing gestures are mapped to the music player icon 20 and stored in the writing gesture database 152 in advance. A stop command mapped to the writing gesture of the stop symbol 32, a pause command mapped to the writing gesture of the pause symbol 34, a next music play command mapped to the writing gesture of the forward symbol 36, and a previous music play command mapped to the writing gesture of the backward symbol 38 are stored in the execution command database 154.

At least one of the stop-symbolic writing gesture 32, the pause-symbolic writing gesture 34, the forward-symbolic writing gesture 36, and the backward-symbolic writing gesture 38 is inputted on the music player icon 20 with a user's finger or an exclusive pen.

When the writing gesture is inputted, the corresponding command is executed as described above, with respect to FIGS. 3 and 4.

Thus, according to an embodiment of the present invention, a user inputs at least one of the writing gestures to play, pause, forward, and backward on the music player icon 20 so that only one input of the writing gesture can make the music player 20 play desired music without following several procedures for the playing of the desired music.

Figure 6:
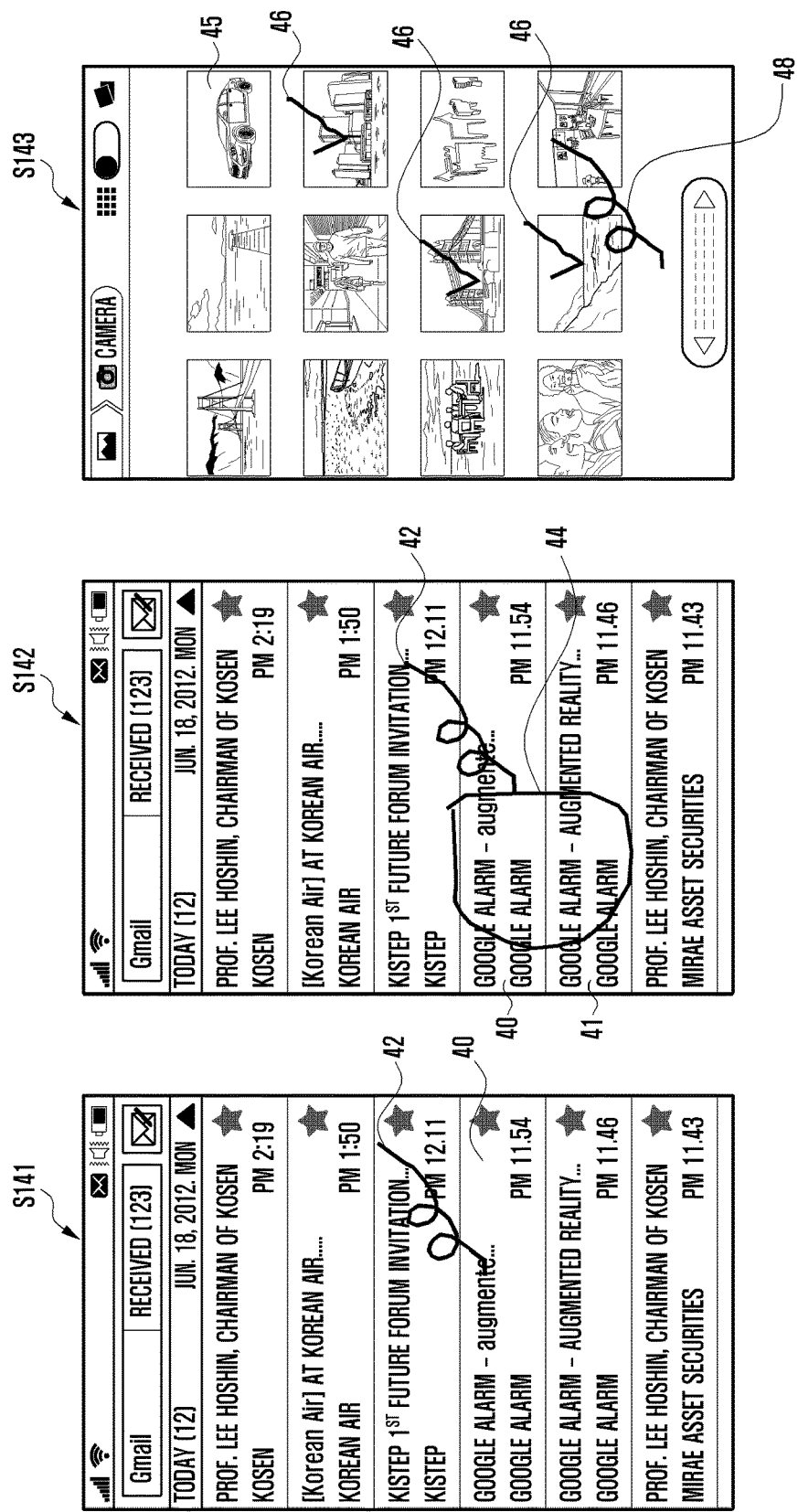
FIG. 6 is a diagram illustrating an operation screen selecting and/or deleting a list displayed on the mobile terminal, according to an embodiment of the present invention.

FIG. 6 is a diagram illustrating an operation screen of selecting and/or deleting a list displayed on the mobile terminal, according to an embodiment of the present invention.

A wedge symbol 46 is defined as a writing gesture to select an item in a list, and a deletion symbol 42 is defined as a writing gesture for deletion. The writing gestures are mapped to a list and stored in the writing gesture database 152 in advance. An item-in-list deletion command mapped to the deletion-symbolic writing gesture 42 and an item-in-list selecting command mapped to the wedge-symbolic writing gesture 46 may be stored in the execution command database 154.

As shown in screen S141, the deletion symbol writing gesture 42 is inputted on at least one item 40 in the list with a user's finger or an exclusive pen. As shown in screen S142, a simultaneous selection symbol 44 and the deletion symbol 42 may be inputted as writing gestures. Alternatively, as shown in screen S143, a wedge symbol 46 to select at least one photo 45 in a photo-list and a deletion symbol 48 to delete a photo to which the wedge symbol 46 is inputted, may be inputted simultaneously as writing gestures.

As shown the screen S141, a single item 40 in a list on which the deletion symbol writing symbol 42 is inputted may be directly deleted. As shown in the screen S142, items 40 and 41 in a list on which the simultaneous selection symbol 44 and the deletion symbol 42 are inputted, may be deleted. Alternatively, as shown in the screen S143, a plurality of photos on which the writing gestures of the wedge symbol 46 and the deletion symbol 42 are inputted may be directly deleted.

Thus, according to an embodiment of the present invention, a user inputs a writing gesture on an item in a list so that he/she may select a plurality of items in the list by inputting a single writing gesture without following processes to select the item in the list, several items in the list simultaneously, or delete the selected one like in the existing several procedures.

FIG. 7 is a diagram illustrating a writing gesture to change a gallery icon directly in the mobile terminal, according to an embodiment of the present invention.

A deletion symbol 54 is defined to delete a representative picture 52 of gallery icon 50. A next picture-selecting symbol 56 is defined to replace the representative picture 52 with a picture stored directly next to the currently displayed representative picture in a gallery application. A previous picture-selecting symbol 38 is defined to replace the representative picture with a picture stored directly before the current representative picture. The symbols are mapped to writing gestures for the gallery icon 30, and stored in the writing gesture database 152 in advance.

As indicated by S133, S134, and S135, the deletion symbol 54, the next picture-selecting symbol 56, and the previous picture-selecting symbol 58 may be inputted on the gallery icon 50 as writing gestures.

As indicated by S133, the currently-displayed representative picture 52 of the gallery icon 50 may be deleted. As indicated by S134, the currently-displayed representative picture 52 of the gallery icon 50 may be replaced with the picture stored directly next to the currently-displayed representative picture. As indicated by S135, the currently-displayed representative picture 52 of the gallery icon 50 may be replaced with the picture stored directly before the currently-displayed representative picture.

The method of executing an application of a mobile terminal by recognizing a writing gesture has been described in accordance with specific items, but may be applied to other icons and combinations thereof based on user or manufacturer settings.

As described above with respect to FIG. 2C, the writing gesture may be inputted in association with two items. A writing gesture associated with two different items, according to an embodiment of the present invention, is described in detail below.

FIGS. 8 to 14 are diagrams illustrating embodiments in which a writing gesture is inputted to target two items.

FIG. 8 is a diagram illustrating an operation screen for uploading a latest photo, photographed with a camera icon application of the mobile terminal, directly to a social network online, according to an embodiment of the present invention.

Referring to FIGS. 1, 2C, and 8, the arrow-shaped writing gesture 330, which is in contact with a screen of the mobile terminal from the camera icon 310 to the social network icon 320, is mapped to the camera icon 310 and the social network icon 320 as a writing gesture to upload a photo photographed with the camera icon directly to the social network online. The writing gesture is stored in the writing gesture database 152.

As indicated by screen S301 of FIG. 8, the arrow-shaped writing gesture 330 may be inputted by an exclusive pen.

Thus, according to an embodiment of the present invention, a user inputs a writing gesture in association with the camera icon 310 and the social network icon 320, so that he/she can upload the latest photographed photo to the social network by inputting a single writing gesture.

Figure 9:
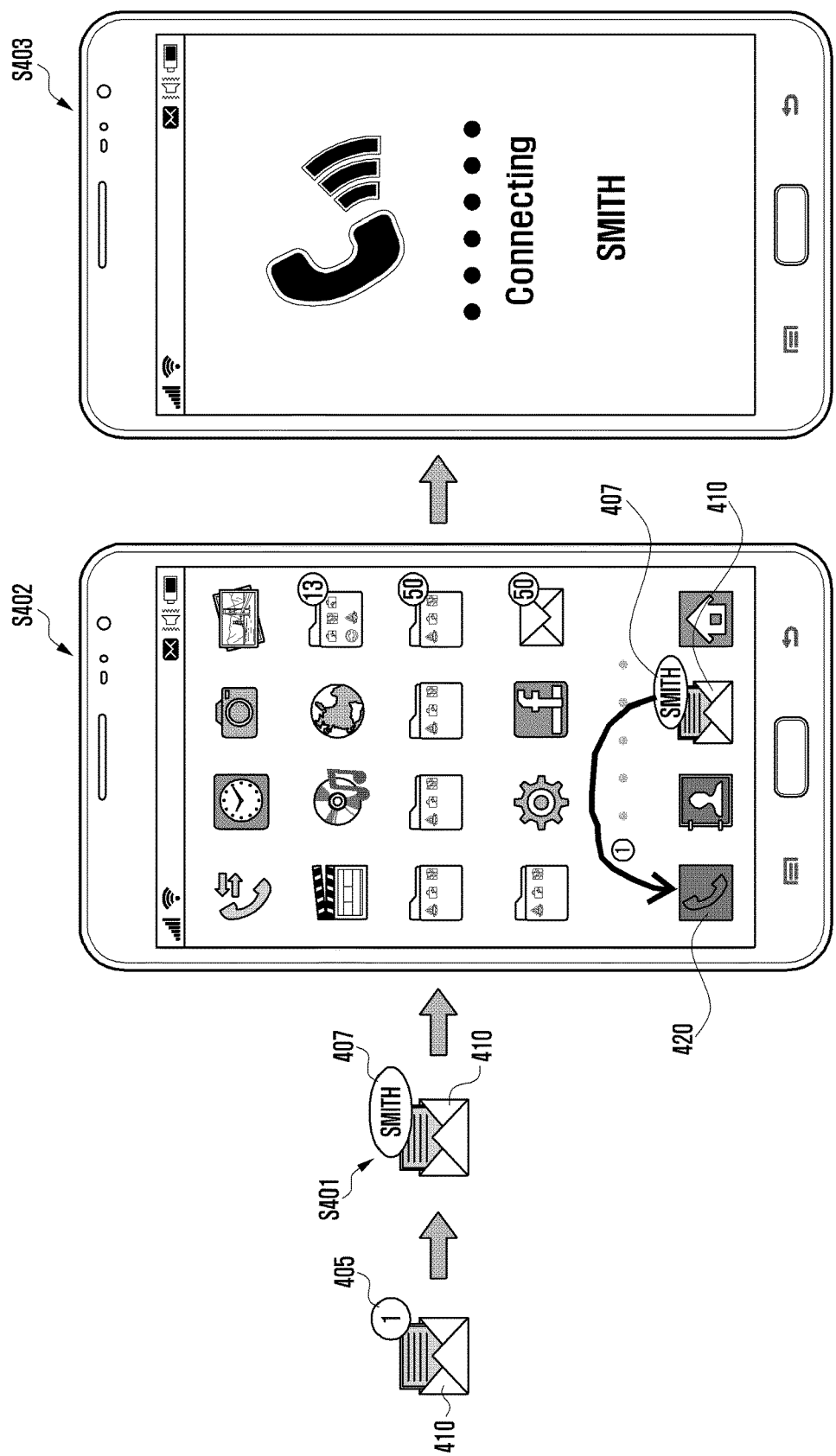
FIG. 9 is a diagram illustrating an operation screen for applying a corresponding phone number of a latest message received by a message application to a call application to execute a call, according to an embodiment of the present invention.

FIG. 9 is a diagram illustrating an operation screen for applying a corresponding phone number of a latest message received by a message application directly to a call application to execute a call by a message icon, according to an embodiment of the present invention.

Referring to FIGS. 1 and 9, as shown in screen S402, an arrow-shaped writing gesture 407 from a message icon 410 to a call icon 420 may be mapped to the message icon 410 and the call icon 420 as a writing gesture to apply representative data related to message information that is generated by the message application and stored in the writing gesture database 152. The arrow-shaped writing gesture 407 from the message icon 410 to the call icon 420 may be mapped to a call execution command, which may be stored in the execution command database 154 in advance.

The representative data may be preset as phone number information of the latest transmitted or received text message. The execution command may be to apply data related to message information that is generated by the message application related to the message icon 410 to a call function execution of the call application related to the call icon 420. For example, the execution command may be to apply phone number data of message received lately by the message application related to the message icon 410 to the call application related to the call icon 420 to try a call service.

As indicated by screen S403, the target item function execution controller 167 applies the phone number, that is, the representative data generated by the message application related to the message icon 410, to the call application related to the call icon 420 to control the call function under the execution command extracted by the execution command extractor 166.

As indicated by S401, when a message is received, a number of received messages 405 is displayed on the message icon 410. Alternatively, in an embodiment of the present invention, identification information such as the name 407 and/or the phone number of a message sender may be displayed on the message icon 410, or the number of the received messages 405, the name 407 and the phone number of the sender may be sequentially displayed. By doing so, a user may figure out information about the received messages more quickly.

In an embodiment of the present invention, the phone number data that was last generated by the message application, related to the message icon 410, may be set to the representative data of the message application related to the message icon 410. The representative data may be converted into an image and displayed on the message icon 410. The representative data may be to identify content of the message application.

According to the above-described embodiment of the present invention, a user inputs a writing gesture in association with the message icon 410 and the call icon 420, so that he/she may directly make a call through a single writing gesture to the sender's phone number of the text message last received by the message application.

Figure 10:
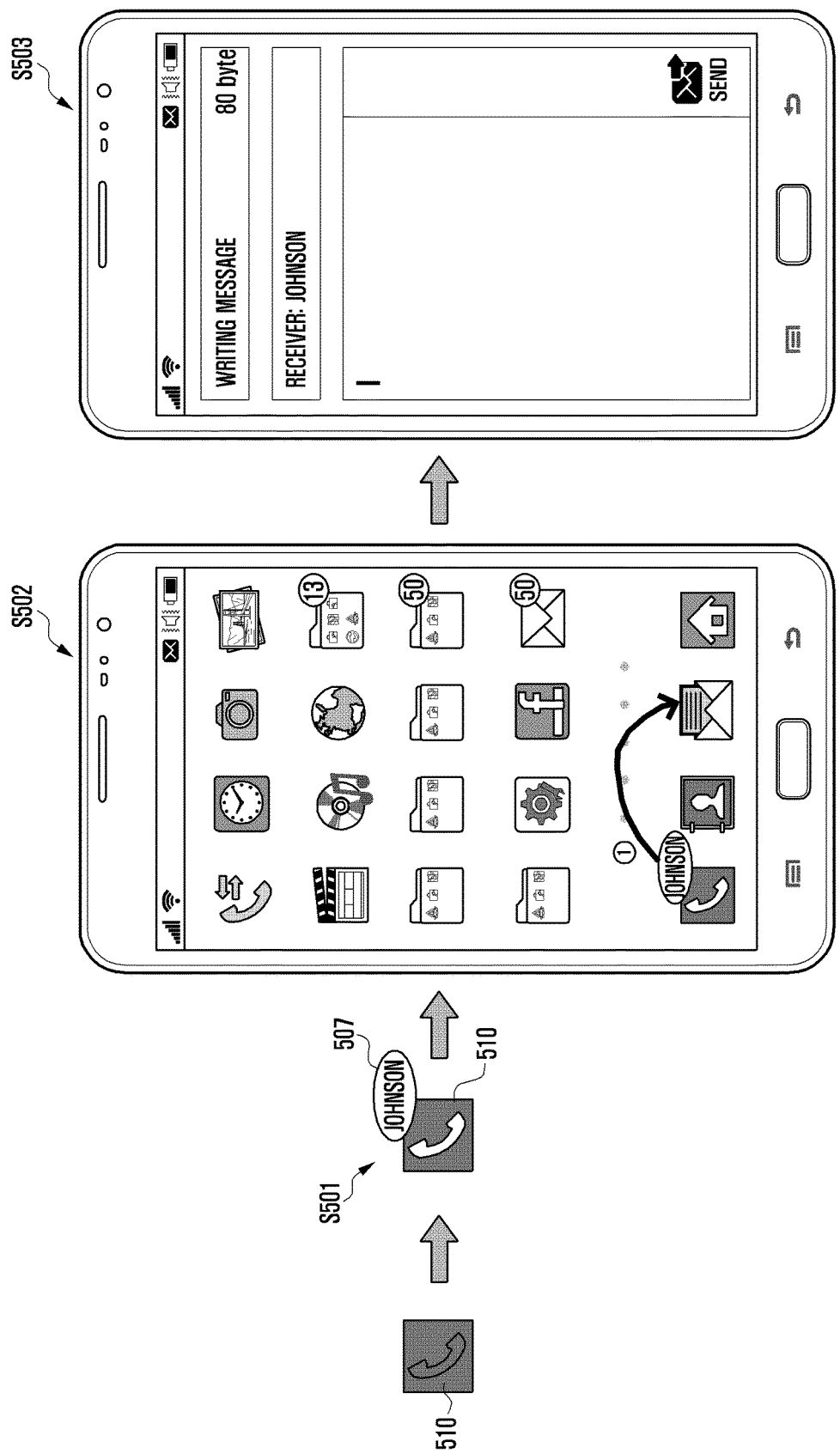
FIG. 10 is a diagram illustrating an operation screen for applying a corresponding phone number of a latest call received by a call application to a message application, according to an embodiment of the present invention.

FIG. 10 is a diagram illustrating an operation screen for applying a corresponding phone number of the last call received by a call icon application to a message application to write a message, according to an embodiment of the present invention.

FIG. 10 is a diagram illustrating an operation screen where phone number data generated by the call application related to the call icon 420, is defined as the representative data, and is directly applied to the message application related to the message icon 410. In converse to the writing gesture as illustrated in FIG. 9, an arrow-shaped writing gesture directs from the call icon 420 to the message icon 410.

Referring to FIGS. 1, 2C, and 10, the arrow-shaped writing gesture associated with the message icon 410 and the call icon 420 may be mapped to the message icon 410 and the call icon 420 as a writing gesture to apply the representative data related to the message information that is generated by the call application, and stored in the writing gesture database 152. The arrow-shaped writing gesture associated with the message icon 410 and the call icon 420 may be mapped to a message sending command that may be stored in the execution command database 154 in advance.

The representative data may be preset as phone number information of the last received call. The execution command may be to apply data related to the phone number information as the representative data that is generated by the call application directly to transmission of a message by the message application.

Next, as indicated by S502 and S503, the target item function execution controller 167 may apply the phone number, that is, the representative data generated by the call application, to the message application to control the message-sending function under the execution command extracted by the execution command extractor 166.

As indicated by S501, when there is a missed call or the latest received call, information such as a caller's name and/or phone number may be converted into an image to display and the number of missed calls and caller's names and phone numbers may be sequentially displayed. By doing so, a user may determine information about the missed calls and the received calls more quickly.

Specifically, in an embodiment of the present invention, the phone number data generated last by the call application related to the call icon 510 may be set as the representative data, and the representative data may be converted into an image 507 to be displayed on the call icon 510. The representative data may be to identify content of the call application.

According to the above-described embodiment of the present invention, a user inputs a writing gesture in association with the message icon 410 and the call icon 420, so that he/she may make a call by inputting only the above-described writing gesture.

Figure 11:
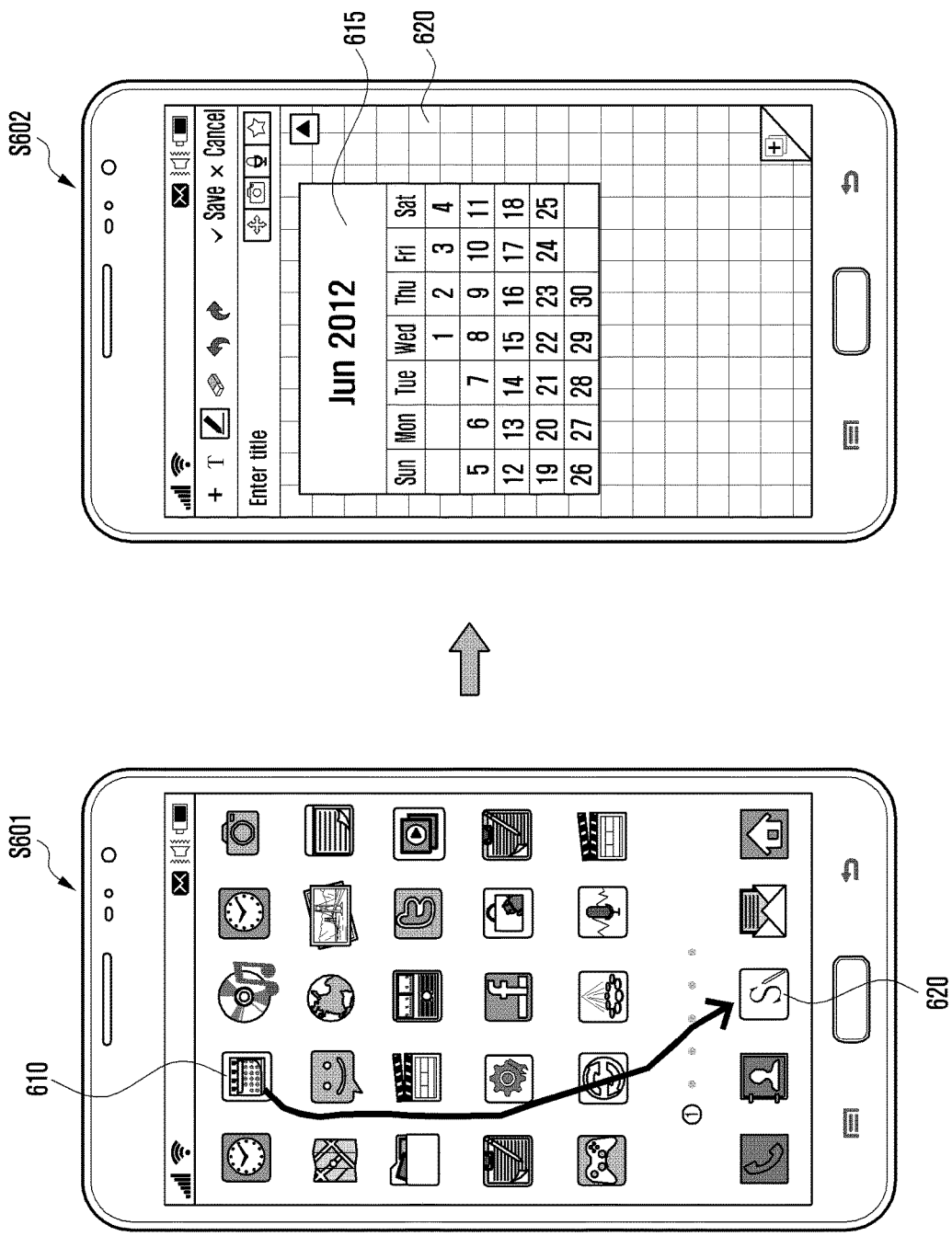
FIG. 11 is a diagram illustrating an operation screen for storing monthly schedule information generated by a planner application directly to a memo application, according to an embodiment of the present invention.

FIG. 11 is a diagram illustrating an operation screen of storing monthly schedule information generated by a planner application directly to a memo application, according to an embodiment of the present invention.

An arrow-shaped writing gesture directed from a planner icon 610 to a memo icon 620 may be inputted. After the input of the writing gesture, steps 320-350 of FIG. 2C are performed.

Consequently, when the writing gesture associated with the planner icon 610 and the memo icon 620 is inputted as shown in screen S601, monthly schedule data 615 generated by the planer application related to the planer icon 610 is stored directly to the memo application related to the memo icon 620, as indicated by screen S602. The representative data of the planer icon 610 may be preset to the latest input monthly schedule 615.

Figure 12:
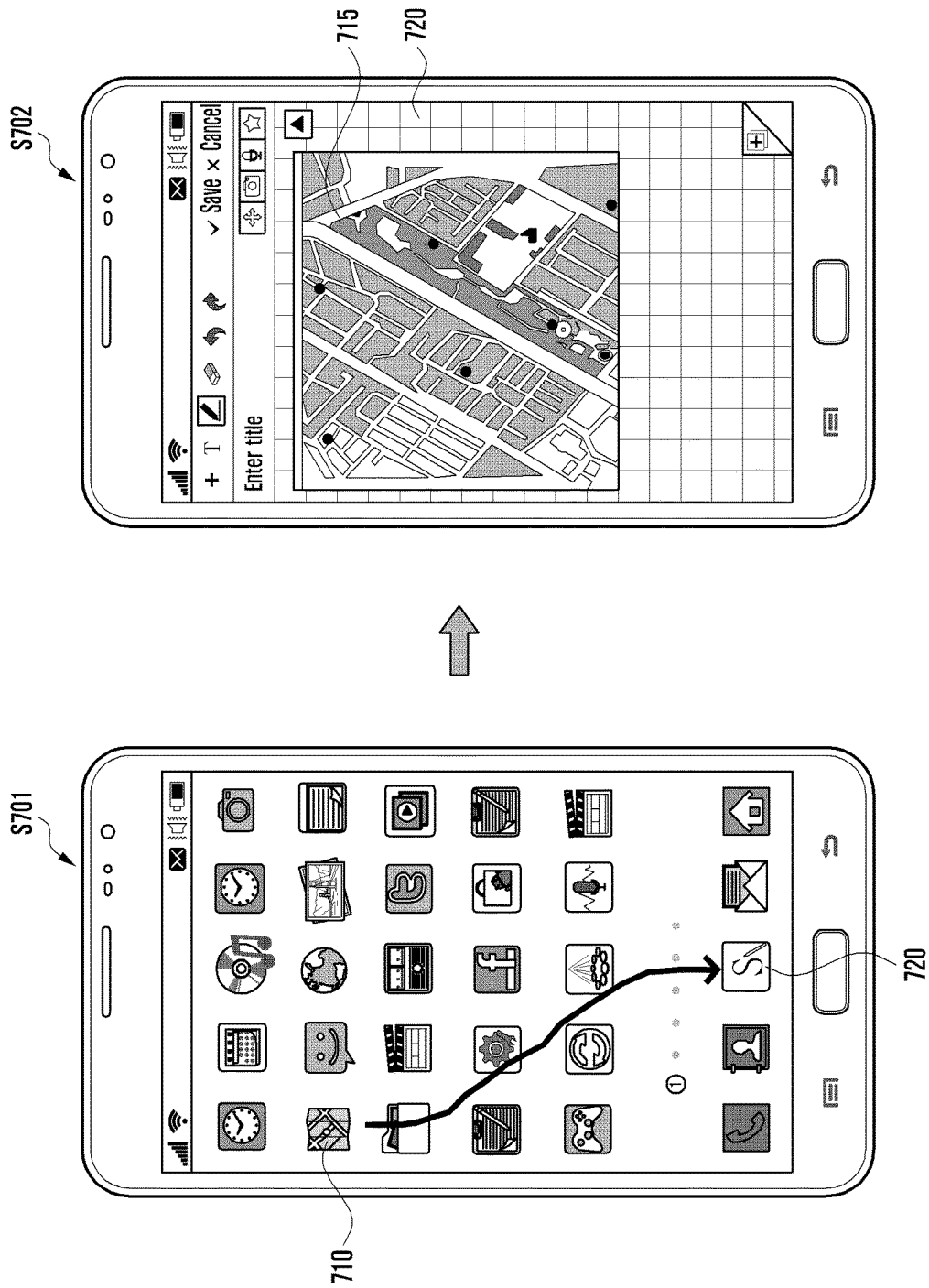
FIG. 12 is a diagram illustrating an operation screen for storing map data outputted by searching for user's current location by a map application directly to a memo application, according to an embodiment of the present invention.

FIG. 12 is a diagram illustrating an operation screen for storing map data outputted by searching for user's current location by a map application directly to a memo application, according to an embodiment of the present invention.

Referring to FIG. 12, as indicated by screen S701, an arrow-shaped writing gesture directed from a map icon 710 to a memo icon 720 may be inputted to store current location map data generated by the map application related to the map icon 710 directly to the memo application related to the memo icon 720.

When the writing gesture is inputted, the steps 320-350 of FIG. 2C are performed.

As shown in screen S702, current location map data 715 generated by the map application related to the map icon 710 may be stored directly to the memo application related to the memo icon 720. The representative data of the map icon 710 is preset to the latest searched map in advance.

Figure 13:
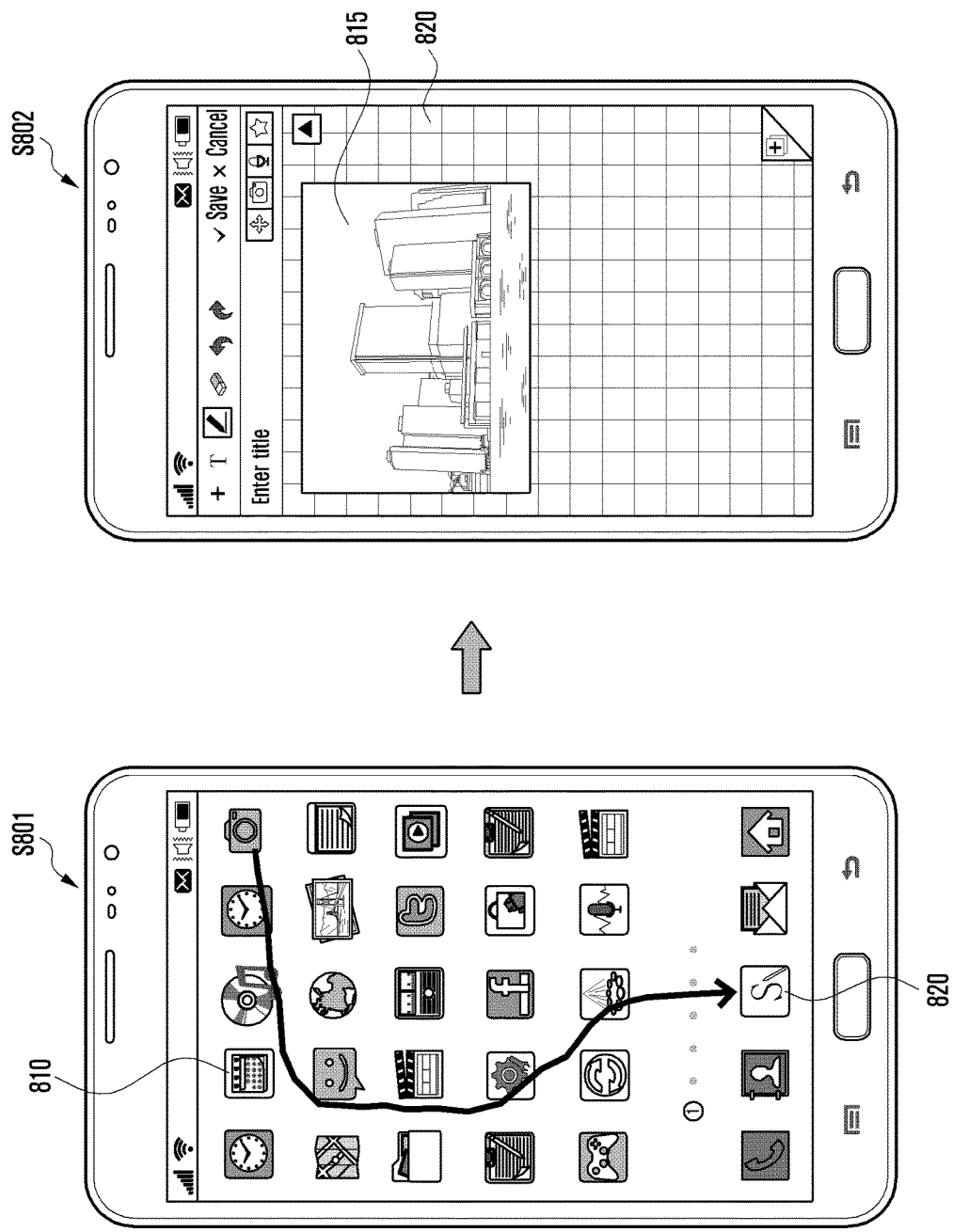
FIG. 13 is a diagram illustrating an operation screen for storing a latest photo photographed by a camera application directly to a memo application, according to an embodiment of the present invention.

FIG. 13 is a diagram illustrating an operation screen for storing a latest photo photographed by a camera application directly to a memo application, according to an embodiment of the present invention.

Referring to FIG. 13, as indicated by screen S801, an arrow-shaped writing gesture directed from a camera icon to the memo icon 820 may be inputted to store photo data 815 generated by the camera application related to the camera icon 91 directly to the memo application 820. When the writing gesture is inputted, the steps 320-350 of FIG. 2C are performed.

As shown in screen S802, the latest photo data 815 generated by the camera application related to the camera icon may be stored directly to the memo icon application related to the memo icon 820. The representative data of the camera application is preset to the latest photo.

Figure 14:
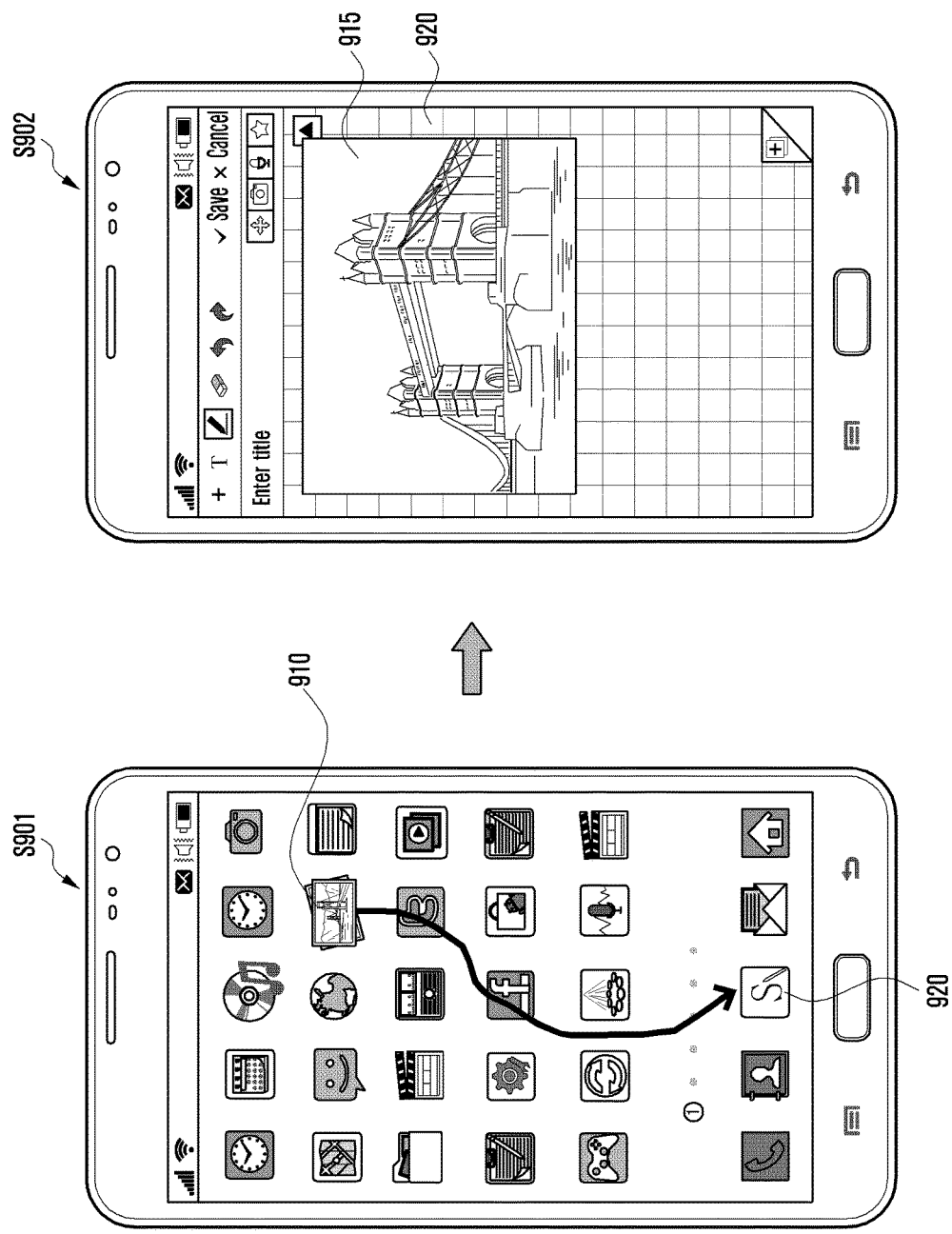
FIG. 14 is a diagram illustrating an operation screen for storing a latest photo stored in a gallery application directly to a memo application, according to an embodiment of the present invention.

FIG. 14 is a diagram illustrating an operation screen for storing the latest photo stored in a gallery application related to a gallery icon 910 directly to a memo application, according to an embodiment of the present invention.

Referring to FIG. 14, an arrow-shaped writing gesture directed from a gallery icon 910 to a memo icon 920, is input to store photo data 915 stored by the gallery application related to the gallery icon 910 directly to the memo application related to the memo icon 920, as shown in screen S901.

When the writing gesture is inputted, steps 320-350 of FIG. 2C are performed.

As indicated in screen S802, the photo data 915 last stored by the gallery application related to the gallery icon 910 may be stored directly to the memo application related to the memo icon 920. The representative data of the gallery icon 910 is preset to the last stored photo.

Figure 15:
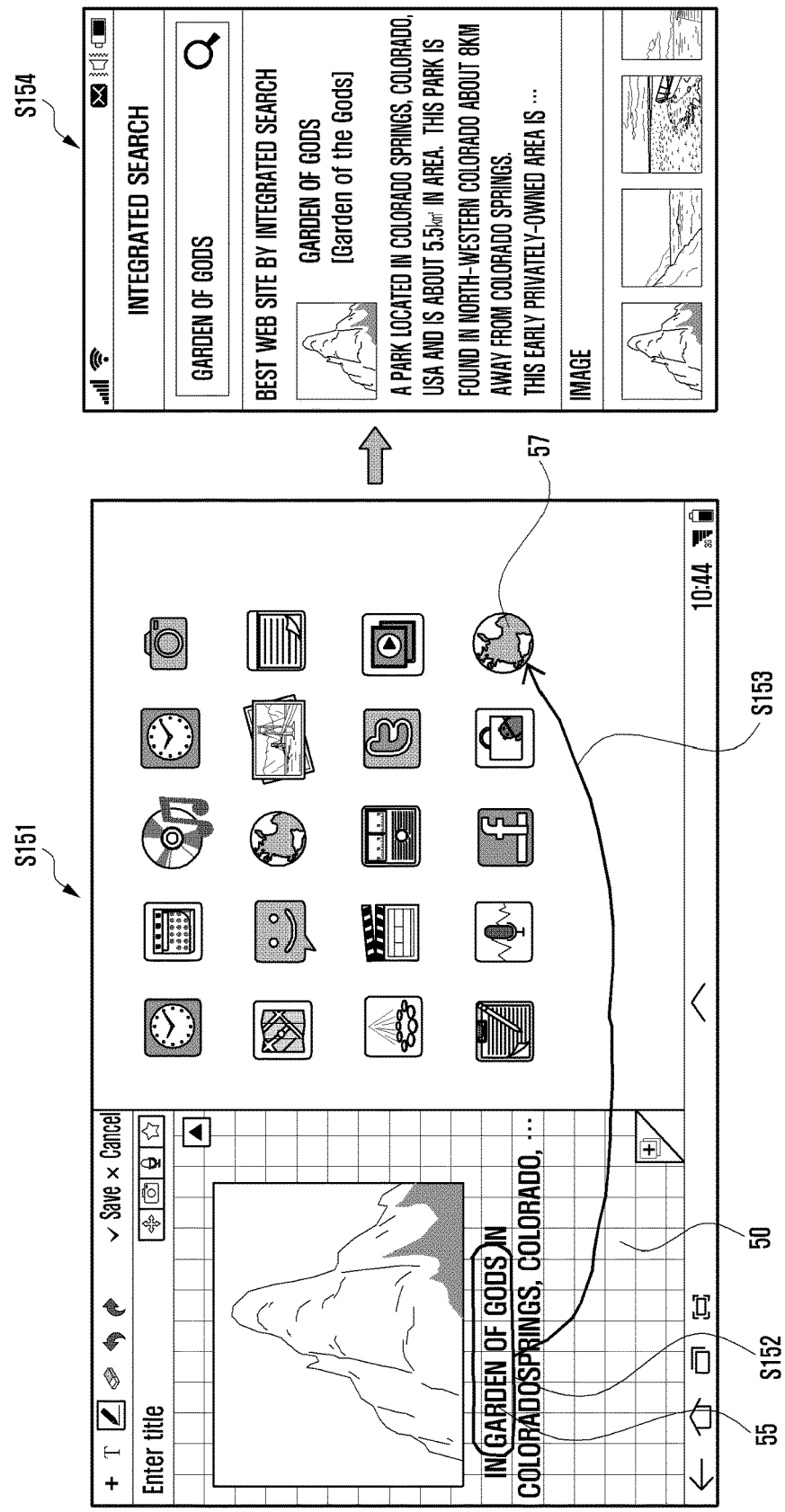
FIG. 15 is a diagram illustrating an operation screen for directly searching for data related to text stored in a memo application with a web browser application, according to an embodiment of the present invention.

FIG. 15 is a diagram illustrating an operation screen for directly searching for some data related to a body text stored in the memo application with a web browser application, according to an embodiment of the present invention.

Particularly, the embodiment illustrated in FIG. 15 shows an operation screen implemented in a mobile terminal with a relatively wide touchscreen.

Referring to FIG. 15, as shown in screen S151, an arrow-shaped writing gesture directed from a memo icon 50 in screen S152 to a web browser icon 57 in screen S153 may be inputted, which selects some data 55 of a body text displayed by the memo application related to the memo icon 50 to the web browser 57.

When the writing gesture is inputted, steps 320-350 of FIG. 2C are performed.

As shown in screen S154, a web page is sought, with the data 55 used as a keyword, by the web browser application related to the web browser icon 57. The representative data of the memo icon application related to the memo icon 50 is set to the body text information data selected by a user through the writing gesture.

Specifically, as shown in screen S154, a search may be carried out by the web browser application with the words 'Garden of Gods' selected from the body text information data using the writing gestures, and the search results may be displayed.

As described above, according to the method of controlling execution of a function of a mobile terminal by recognizing a user's writing gesture and the apparatus for performing the same proposed by the present invention, a user can easily access execution of the function of a mobile terminal and the control thereof. Moreover, the input procedures for executing the function of the mobile terminal and the control thereof are simplified so that a user can conveniently and easily perform function execution of a mobile terminal and the control thereof.

For the execution of specific functions between a plurality of items with an input writing gesture in association with the items, the input procedures for function execution and the control thereof may be simplified.

A method of outputting contents in a mobile terminal supporting the writing gesture inputting mode of the present invention may be implemented by program commands, which are executed by various computing devices and may be stored in computer-readable recoding media. The computer-readable recording media may include program commands, data files, and data structures or combinations thereof. The program commands stored in the recording media may be designed and configured for the present invention or may be also known to a person having ordinary skill in the art for the public use.

Examples of computer-readable media include magnetic media such as hard disks, floppy disks, and magnetic tape; optical media such as Compact Disc-ROM (CD-ROM) disks and Digital Video Discs (DVDs); magneto-optical media such as floptical disks; and hardware devices that are specially configured to store and perform program commands, such as ROM, RAM, flash memory, and the like. Examples of program commands include both machine code, such as that produced by a compiler, and files containing higher level code that may be executed by the computer using an interpreter. The described hardware devices may be configured to act as one or more software modules in order to perform the operations of the above-described embodiments of the present invention, or vice versa.

While the invention has been shown and described with reference certain embodiments thereof, it will be understood by those skilled in the art that various changes in form and detail may be made therein without departing from the spirit and scope of the invention, as defined by the appended claims.

What is claimed is:

1. A method of controlling a mobile terminal, the method comprising:

displaying, on a touchscreen of the mobile terminal, content of a first application selected among a plurality of icons displayed on the touchscreen, wherein each icon represents a respective application;

detecting a user selection of text of the displayed content of the first application;

detecting a writing gesture directed from the selected text of the first application to a target application displayed on the touchscreen, wherein the writing gesture is inputted by the user in contact with the touchscreen by writing at least one of a character, a number, a symbol, a figure, a line, and a combination thereof, to point from the selected text of the first application as a start point to the target application as an end point;

comparing a preset writing gesture of the target application with the detected writing gesture to determine whether the detected writing gesture is similar to, or identical to, one of a plurality of preset writing gestures stored in a writing gesture database;

when the detected writing gesture is determined that there is a similar or identical preset writing gesture in the writing gesture database, extracting an execution command of the target application mapped to the preset writing gesture corresponding to the detected writing gesture, wherein the execution command comprises various functions of the target application;

obtaining representative data of the content of the first application for controlling of execution of the various functions of the target application by recognizing the writing gesture, wherein the representative data is the text of the content of the first application displayed by execution of the first application; and executing a function of the target application corresponding to the preset writing gesture using the representative data obtained from the first application.

2. The method of claim 1, wherein the representative data comprises latest data generated by performing of the function of the first application.

3. The method of claim 1, further comprising, before detecting the writing gesture, selecting one of a normal touch input mode and a writing gesture input mode for execution of the mobile terminal.

4. The method of claim 3, wherein the writing gesture input mode is selected in the mobile terminal by a finger of user, or with an exclusive pen.

5. The method of claim 1, wherein performing of the function of the target application is controlled by at least one of a number, a size and shape of a figure, and a length, direction, shape, and thickness of the line, of the input writing gesture.

6. The method of claim 1, wherein the target application comprises at least one of an icon, a widget, a list, text, and a Graphical User Interface (GUI).

7. The method of claim 1, further comprising:
storing information about at least one of the first application, the target application and information about the detected writing gesture.

8. The method of claim 1, further comprising:
making, by the mobile terminal, a request to repeat input of the writing gesture or a request for input of another writing gesture, when the detected writing gesture is determined to not match the preset writing gesture.

9. A mobile terminal comprising:
a touchscreen;
a memory storing instructions; and
a processor configured to execute the stored instructions to at least:
display on the touchscreen details of a first application selected among a plurality of icons displayed on the touchscreen, wherein each icon represents a respective application;
detect a user selection of text of the displayed content of the first application;
detect a writing gesture directed from the selected text of the first application to a target application displayed on the touchscreen, wherein the writing gesture is inputted by the user in contact with the touchscreen by writing at least one of a character, a number, a symbol, a figure, a line, and a combination thereof, to point from the selected text of the first application as a start point to the target application as an end point;

compare a preset writing gesture of the target application with the detected writing gesture to determine whether the detected writing gesture is similar to, or identical to, one of a plurality of preset writing gestures stored in a writing gesture database when the detected writing gesture is determined that there is a similar or identical preset writing gesture in the writing gesture database, extracting an execution command of the target application mapped to the preset writing gesture corresponding to the detected writing gesture, wherein the execution command comprises various functions of the target application;

obtain representative data of the content of the first application for controlling of execution of the various functions of the target application by recognizing the writing gesture, wherein the representative data is the text of the content of the first application displayed by execution of the first application; and execute a function of the target application corresponding to the preset writing gesture using the representative data obtained from the first i application.

10. The mobile terminal of claim 9, wherein the memory comprises:
the writing gesture database in which the preset writing gesture mapped to at least one of the first target application and the second target application is stored; and
the execution command database in which a command mapped to the preset writing gesture is stored,
wherein the processor is further configured to receive a selecting signal to select one of a normal touch input mode and a writing gesture input mode of the mobile terminal.

11. The mobile terminal of claim 10, wherein the processor is further configured to receive one of a selecting signal to select one of the normal touch input mode and the writing gesture input mode of the mobile terminal from a user of the mobile terminal, and a selecting signal to select the writing gesture input mode from an exclusive pen associated with the mobile terminal to switch the input mode to the writing gesture input mode.

12. The mobile terminal of claim 9, wherein the extracted representative data is converted into an image and displayed on the target application.

13. The mobile terminal of claim 12, wherein the representative data comprises latest data generated by the first application and information to identify content of the first application.

14. The mobile terminal of claim 9, wherein the touchscreen comprises:
a touch panel to which the writing gesture is inputted;
a screen activated according to performing of the function of at least one of the first application and the target application; and
a display panel outputting generated data.

15. The mobile terminal of claim 9, wherein performing of the function of the target application is controlled by at least one of a kind, a shape, and a direction of the writing gesture.

* * * * *